US009441991B2

(12) United States Patent
Haga et al.

(10) Patent No.: US 9,441,991 B2
(45) Date of Patent: Sep. 13, 2016

(54) METHOD FOR PROVIDING DATA USING FRIDGE'S LOG INFORMATION

(71) Applicant: PANASONIC INTELLECTUAL PROPERTY CORPORATION OF AMERICA., Torrance, CA (US)

(72) Inventors: Tomoyuki Haga, Nara (JP); Motoji Ohmori, Osaka (JP); Natsume Matsuzaki, Osaka (JP); Yuichi Futa, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 7 days.

(21) Appl. No.: 14/405,999

(22) PCT Filed: Apr. 11, 2014

(86) PCT No.: PCT/JP2014/002085
§ 371 (c)(1),
(2) Date: Dec. 5, 2014

(87) PCT Pub. No.: WO2014/171119
PCT Pub. Date: Oct. 23, 2014

(65) Prior Publication Data
US 2015/0150088 A1 May 28, 2015

Related U.S. Application Data

(60) Provisional application No. 61/813,394, filed on Apr. 18, 2013.

(30) Foreign Application Priority Data

Jun. 28, 2013 (JP) .................................. 2013-136020

(51) Int. Cl.
*G06F 7/04* (2006.01)
*G06F 15/16* (2006.01)
(Continued)

(52) U.S. Cl.
CPC ............... *G01D 9/005* (2013.01); *F25D 29/00* (2013.01); *G01M 99/008* (2013.01); *G06Q 50/10* (2013.01);
(Continued)

(58) Field of Classification Search
CPC ........ F24F 11/00; G01D 9/005; H04L 63/08; F25D 2700/12; F25D 17/062; F25B 7/00; F25B 2700/21; F25B 49/00
USPC ......................................................... 702/184
See application file for complete search history.

(56) References Cited

U.S. PATENT DOCUMENTS 3,935,714 A * 2/1976 Woolley .................. F25D 11/02
62/187
4,604,871 A * 8/1986 Chiu ...................... F25D 29/008
340/588

(Continued)

FOREIGN PATENT DOCUMENTS

JP 11-337252 12/1999
JP 2001-248955 9/2001

(Continued)

OTHER PUBLICATIONS

International Search Report for corresponding International Application No. PCT/JP2014/002085 and English translation mailed Jul. 8, 2014.

(Continued)

*Primary Examiner* — Jayesh Jhaveri
(74) *Attorney, Agent, or Firm* — Renner, Otto, Boisselle & Sklar, LLP

(57) ABSTRACT

This data providing method is carried out by a computer (460) built in a data processing system (1) which is designed to collect log information from electronic devices through a network (30) and provide services based on that log information for authenticated users. The method includes: receiving a fridge's (100a, 100b) log information through the network; generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; and providing the display data for an authenticated user's display terminal (130a, 130b).

22 Claims, 17 Drawing Sheets

(51) Int. Cl.
*G06F 17/30* (2006.01)
*H04L 29/06* (2006.01)
*G01D 9/00* (2006.01)
*G06Q 50/10* (2012.01)
*H04M 11/00* (2006.01)
*H04Q 9/00* (2006.01)
*H04L 12/28* (2006.01)
*G01M 99/00* (2011.01)
*F25D 29/00* (2006.01)
*F25B 7/00* (2006.01)
*F24F 11/00* (2006.01)
*F25D 17/06* (2006.01)
*F25B 49/00* (2006.01)

(52) U.S. Cl.
CPC .......... *H04L 12/28* (2013.01); *H04L 12/2825* (2013.01); *H04L 63/08* (2013.01); *H04M 11/00* (2013.01); *H04Q 9/00* (2013.01); *F24F 11/00* (2013.01); *F25B 7/00* (2013.01); *F25B 49/00* (2013.01); *F25B 2700/21* (2013.01); *F25D 17/062* (2013.01); *F25D 2400/36* (2013.01); *F25D 2500/06* (2013.01); *F25D 2600/02* (2013.01); *F25D 2700/02* (2013.01); *F25D 2700/12* (2013.01); *F25D 2700/14* (2013.01); *H04L 2012/285* (2013.01)

(56) References Cited

U.S. PATENT DOCUMENTS

| | | | | |
|---|---|---|---|---|
| 5,601,143 | A * | 2/1997 | Binder | B01L 7/02 165/61 |
| 5,711,159 | A * | 1/1998 | Whipple, III | F25D 29/00 62/186 |
| 8,539,783 | B1 * | 9/2013 | Bunch | A47F 3/0482 62/150 |
| 2001/0010516 | A1 | 8/2001 | Roh et al. | |
| 2003/0005710 | A1 * | 1/2003 | Singh | A23G 9/00 62/129 |
| 2003/0120972 | A1 | 6/2003 | Matsushima et al. | |
| 2004/0210419 | A1 * | 10/2004 | Wiebe | F25B 49/005 702/182 |
| 2006/0047382 | A1 | 3/2006 | Morioka et al. | |
| 2006/0123807 | A1 * | 6/2006 | Sullivan | G01D 4/004 62/129 |
| 2006/0196199 | A1 * | 9/2006 | Hunt | F25D 29/00 62/132 |
| 2009/0093917 | A1 * | 4/2009 | Smith | F25B 49/005 700/300 |
| 2010/0292961 | A1 * | 11/2010 | Moss | G01D 4/002 702/188 |
| 2011/0224947 | A1 * | 9/2011 | Kriss | F24F 3/1603 702/179 |
| 2011/0251807 | A1 * | 10/2011 | Rada | G01D 4/00 702/61 |
| 2012/0019378 | A1 * | 1/2012 | Watson | H04L 12/2825 340/539.1 |
| 2013/0282624 | A1 * | 10/2013 | Schackmuth | G08B 21/182 705/412 |
| 2014/0165614 | A1 * | 6/2014 | Manning | F25D 29/00 62/62 |

FOREIGN PATENT DOCUMENTS

| | | | |
|---|---|---|---|
| JP | 2001248955 A | * | 9/2001 |
| JP | 2003-172578 | | 6/2003 |
| JP | 2006-057906 | | 3/2006 |
| JP | 2006057906 A | * | 3/2006 |
| JP | 4206953 | | 10/2008 |
| JP | 2010-112632 | | 5/2010 |
| JP | 2010112632 A | * | 5/2010 |
| JP | 4559195 | | 7/2010 |
| JP | 2011-043263 | | 3/2011 |

OTHER PUBLICATIONS

Co-pending U.S. Appl. No. 14/780,128, filed Sep. 25, 2015 (application provided).

* cited by examiner

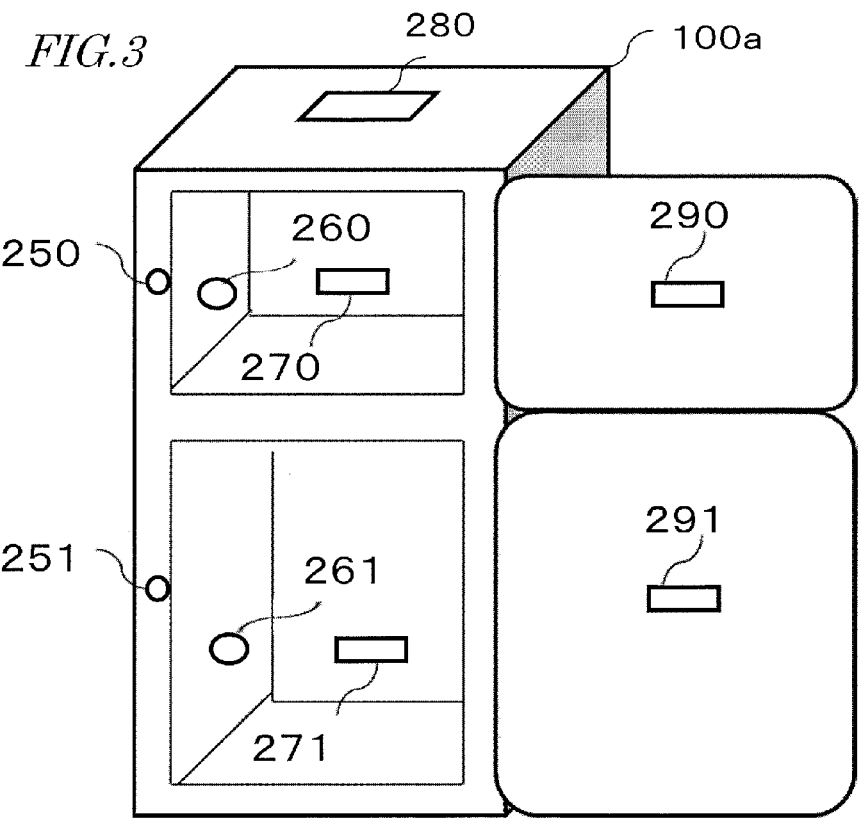
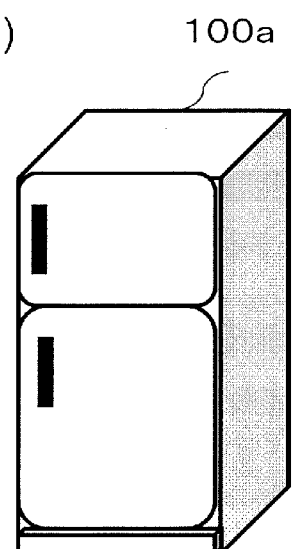
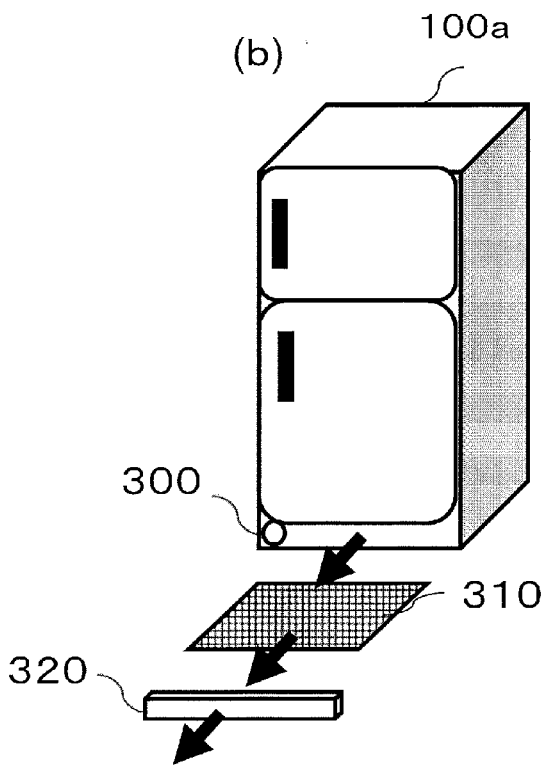

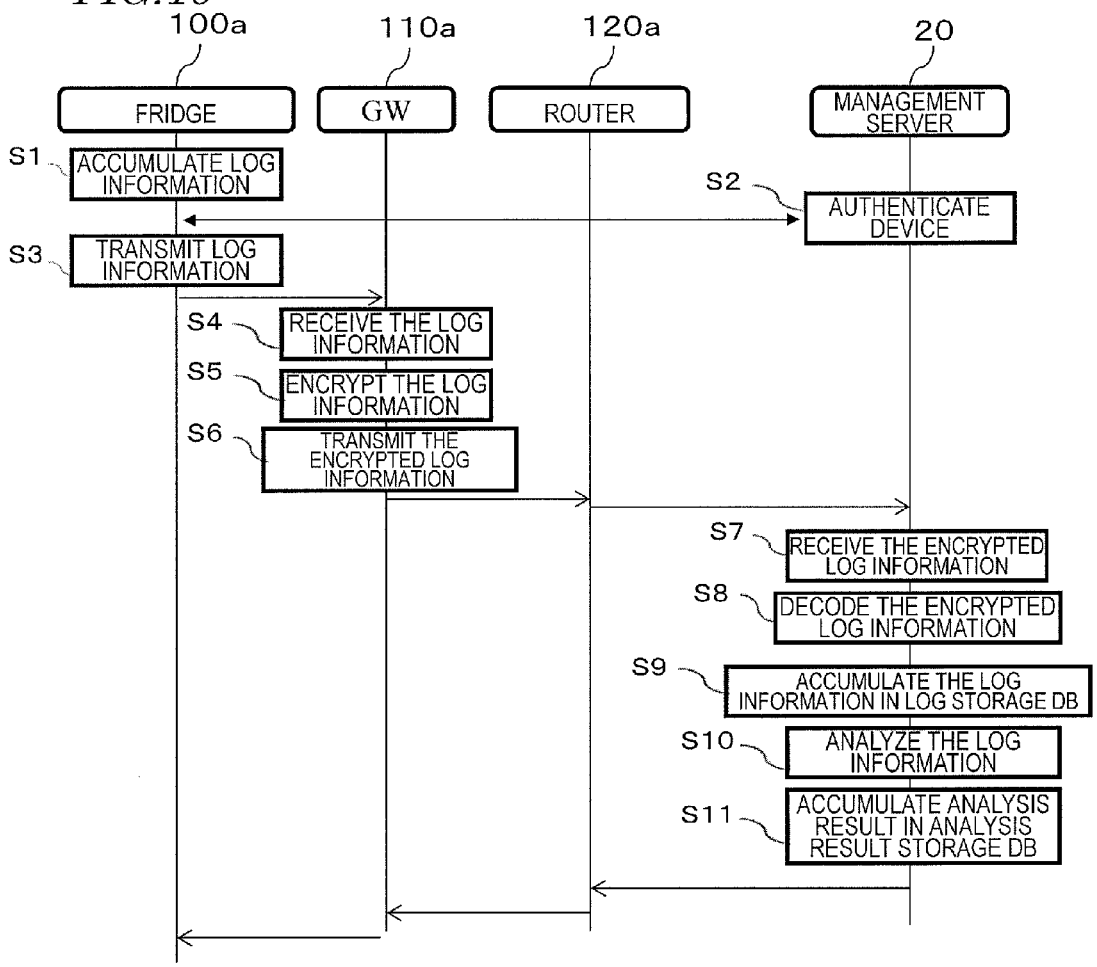

| PRODUCT TYPE ID | LOT # | CONDITION | RESULT/TREND |
|---|---|---|---|
| ABC-123 | AA1 | ① IF COMPRESSOR HAS OPERATED FOR 10 YEARS OR MORE IN TOTAL AT 2000 rpm; AND ② IF REFRIGERATION PERFORMANCE HAS DECLINED THREEFOLD COMPARED TO WHEN IT WAS PURCHASED | THE COMPRESSOR WENT OUT OF ORDER IN 100 CASES. |
| ABC-123 | AA2 | ① IF COMPRESSOR HAS OPERATED FOR 15 YEARS OR MORE IN TOTAL AT 2000 rpm; AND ② IF REFRIGERATION PERFORMANCE HAS DECLINED FIVEFOLD COMPARED TO WHEN IT WAS PURCHASED | THE COMPRESSOR WENT OUT OF ORDER IN 300 CASES. |
| ABC-123 | AA2 | ① IF THE AMOUNT STORED HAS BEEN 80% FOR ONE MONTH OR MORE | POWER CONSUMPTION INCREASED BY 10% COMPARED TO WHEN THE AMOUNT STORED WAS 50% |
| ABC-456 | BB1 | ① IF NO CLEANING HAS BEEN DONE FOR ONE YEAR OR MORE, AND ③ IF REFRIGERATION PERFORMANCE HAS DECLINED TWOFOLD OR MORE COMPARED TO WHEN IT WAS PURCHASED | POWER CONSUMPTION INCREASED BY 20% COMPARED TO WHEN THE FILTER WAS CLEAN |

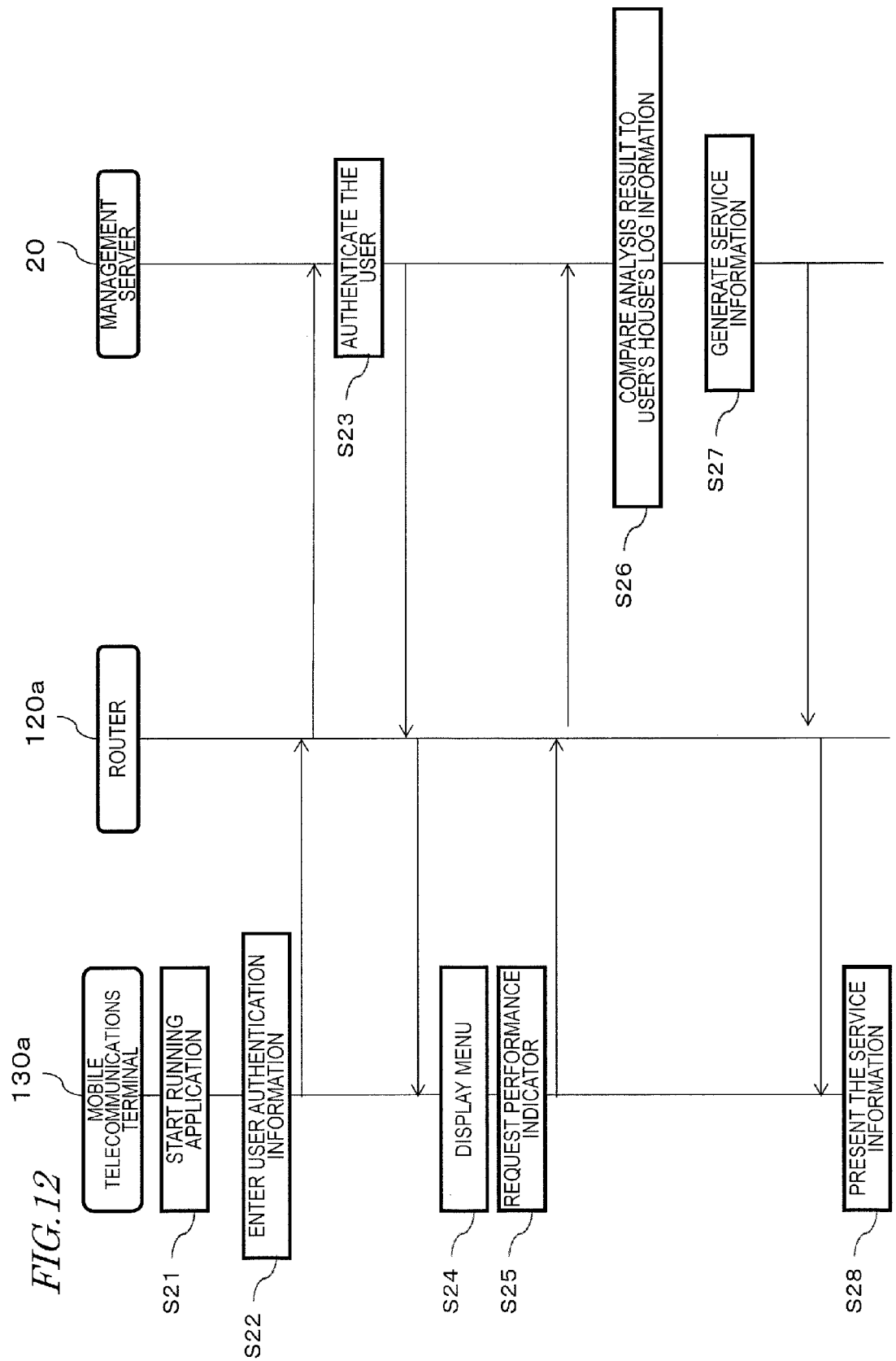

METHOD FOR PROVIDING DATA USING FRIDGE'S LOG INFORMATION

TECHNICAL FIELD

The present disclosure provides a data providing method for use in a data processing system which is designed to provide services by using log information collected from a user's own fridge.

BACKGROUND ART

People have studied systems for collecting log information from a consumer electronic device in a general household and providing services by reference to the log information thus collected. For example, Patent Document No. 1 mentions a system for aiding a consumer in maintaining his or her consumer electronic device, and Patent Document No. 2 mentions a system for estimating the degree of decline in an air conditioner's performance.

CITATION LIST

Patent Literature

Patent Document No. 1: Japanese Patent No. 4559195
Patent Document No. 2: Japanese Patent No. 4206953

SUMMARY OF INVENTION

Technical Problem

However, such systems have not been realized yet and future studies and further improvements are needed to put those systems into practical use.

A non-limiting exemplary embodiment of the present application provides a data providing method which uses log information collected from an electronic device.

Solution to Problem

An exemplary data providing method to overcome the problem described above is carried out by a computer built in a data processing system which is designed to collect log information from electronic devices through a network and provide services based on that log information for authenticated users. The data providing method includes: receiving a fridge's log information through the network; generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; and providing the display data for an authenticated user's display terminal.

This general and particular aspect can be implemented as a system, a method or a computer program or a combination thereof.

Advantageous Effects of Invention

A data providing method according to an aspect of the present invention contributes to realizing further improvement which needs to get done to put a data processing system into practical use.

BRIEF DESCRIPTION OF DRAWINGS

FIG. 3 Illustrates a group of sensors provided for a fridge according to an exemplary embodiment.

FIG. 4 (a) and (b) illustrate some parts that a fridge according to an exemplary embodiment may have.

FIG. 10 Shows a sequence in which operation logs are collected by a server from a fridge according to an exemplary embodiment.

FIG. 11 Shows an exemplary configuration for a DB which stores the results of analysis that has been made based on the operation logs collected by the server from the fridge in the exemplary embodiment.

FIG. 12 Shows a sequence in which a server according to an exemplary embodiment transmits information about the fridge's operation logs collected to a display terminal.

DESCRIPTION OF EMBODIMENTS

Figure 1:
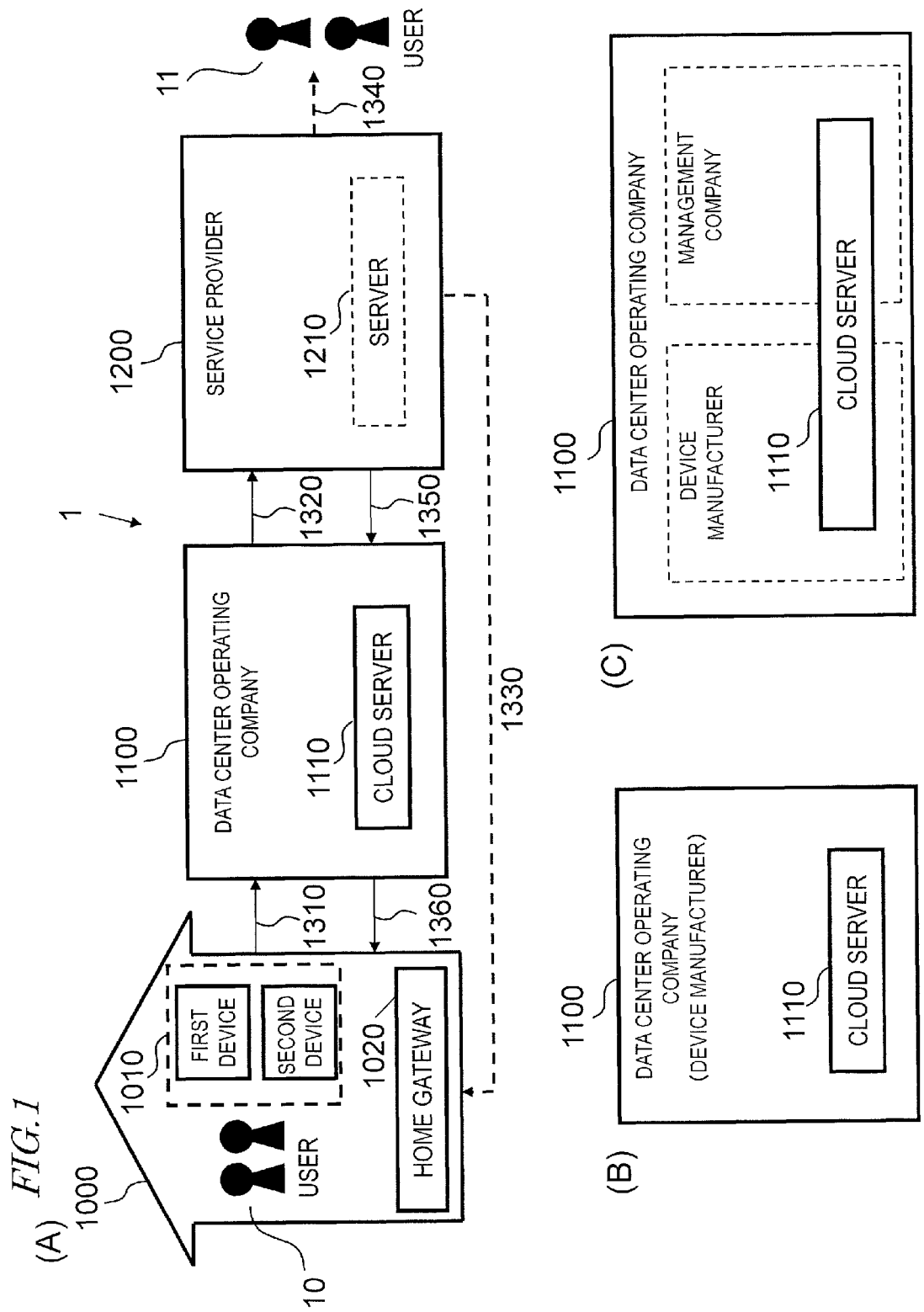
FIG. 1 (A) outlines the service provided by a system according to an exemplary embodiment, (B) illustrates an example in which a device manufacturer functions as a data center operating company, and (C) illustrates an example in which both or one of a device manufacturer and a management company functions as a data center operating company.

First of all, the findings that form the basis of the present disclosure will be described.

The system for aiding a consumer in maintaining his or her electronic device as disclosed in Patent Document No. 1 collects supply voltage and drying time data as data that needs to be used to do maintenance in cases of a washing machine's failure or defects by connecting a personal computer to the washing machine.

The system for estimating the degree of decline in an air conditioner's performance as disclosed in Patent Document No. 2 estimates the degree of decline in the air conditioner's performance by comparing information about the equipment for one year after its installment (including in-room temperature, outdoor temperature, preset operating temperature and power consumption) to information about that equipment at the same time of each year under the same load condition.

According to the technique disclosed in Patent Document No. 1, data is saved using a memory which is built in the washing machine. That is why the size of the data that can be saved in the memory is constrained by the capacity of that memory, and therefore, the contents of the data saved are also subject to some constraints.

For example, according to the technique disclosed in Patent Document No. 1, the contents of the data saved in the memory are limited to the settings selected by the user and data about the previous maintenance and the maintenance before the previous one. Such contents are too limited to be used as check items to do maintenance. Also, the types and contents of such data saved in the memory are determined on the supposition that the data will be used only by a maintenance person who does maintenance on the washing machine. For example, data about the supply voltage and drying time of the washing machine are saved there. Under circumstances such as these, the user cannot get data about the washing machine and check out the condition of the washing machine by him- or herself.

According to the technique disclosed in Patent Document No. 2, on the other hand, information about the equipment for one year after its installment is used as reference information to be compared to information about that equipment at the same time of each year under the same load condition. That is to say, according to the technique of Patent Document No. 2, information at a point in time during the initial stage is just compared to information at present. Thus, it is impossible to understand, only by reference to that information, what series of changes the target device has gone through from its initial stage through the present. For example, as for an air conditioner installed at an office building or a factory, an expert maintenance person is asked to do regular maintenance and check on it. Thus, he or she can still determine the equipment's condition by reference to that little information. As for a consumer electronic device for a general household, however, it is difficult for the user to determine exactly what the condition of the target device is just by reference to the difference between the information about the equipment for one year after its installment and the information about the same equipment for this year.

Meanwhile, people have studied methods for providing cloud services recently. As a part of their studies, someone proposed that log information indicating how an electronic device is used be collected by a cloud server from the electronic device and cloud services be provided by reference to that log information. However, such methods are still under study, and at present, there is no data processing system yet which provides cloud services by reference to electronic devices' log information.

Thus, in order to improve the functionality of such a data processing system that provides cloud services by reference to an electronic device's (such as a fridge's) log information, the present inventors propose the following improvements.

A data providing method according to an aspect of the present disclosure is carried out by a computer built in a data processing system which is designed to collect log information from electronic devices through a network and provide services based on that log information for authenticated users. The data providing method includes: receiving a fridge's log information through the network; generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; and providing the display data for an authenticated user's display terminal.

The display data may represent the trend of change of the recovery time using multiple sets of sample data. The multiple sets of sample data may be data based on the fridge's log information that have been gotten at multiple different points in time.

The display data represents the trend of change of the recovery time using at least three sets of sample data.

The display data may represent the trend of change of the recovery time that indicates how long it takes for the inside temperature to recover the preset operating temperature in a situation where room temperature and the inside temperature maintain a constant relation since the fridge's door was closed.

Each set of sample data may be a set of data which has been gotten at the same room temperature and at the same inside temperature and which is based on the fridge's log information.

The fridge may have a filter, and the multiple sets of sample data may include information about cleaning history of the filter.

The display data may include information about the number of revolutions of a drive system for the fridge.

A data providing method according to another aspect of the present disclosure is carried out by a computer built in a data processing system which is designed to collect log information from electronic devices through a network and provide services based on that log information for authenticated users. The data providing method includes: receiving a fridge's log information through the network; generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; providing the display data for an authenticated user's display terminal; and if the recovery time has exceeded a predetermined amount of time, further providing maintenance information about the fridge's maintenance for the display terminal.

The display data may represent the trend of change of the recovery time that indicates how long it takes for the fridge's inside temperature to recover the preset operating temperature if room temperature and the inside temperature maintain a constant relation since the fridge's door was closed.

The maintenance information may be included in the display data.

If the recovery time is increasing compared to past history included in the fridge's log information and if the recovery time has exceeded the predetermined amount of time, the data providing method may include further providing maintenance information for the display terminal.

The data providing method may include: finding at least one more fridge which has been manufactured in the same lot as the fridge by reference to a database in which information about fridges' defects is accumulated on a lot-by-lot basis; further spotting another fridge, in which the recovery time exceeds the predetermined amount of time, from the at least one more fridge that has been found; and providing maintenance information associated with information about the defect of that another fridge that has been spotted.

The fridge may have a sensor to detect the amount stored in the fridge. If the recovery time has exceeded the predetermined amount of time and if the amount stored in the fridge that has been detected by the sensor has exceeded a certain limit, a message saying that the recovery time has exceeded the predetermined amount of time due to the fact that the amount stored in the fridge has exceeded the certain limit may be sent to the display terminal. But if the recovery time has exceeded the predetermined amount of time and if the amount stored in the fridge that has been detected by the sensor is equal to or smaller than the certain limit, maintenance information about the fridge may be provided for the display terminal.

A data providing method according to still another aspect of the present disclosure is carried out by a computer built in a data processing system which is designed to collect log information from electronic devices through a network and provide services based on that log information for authenticated users. The data providing method includes: receiving a fridge's log information through the network; generating display data, representing a trend of change of the power consumed since the fridge's door was closed and until the fridge's inside temperature recovered its preset operating temperature, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; and providing the display data for an authenticated user's display terminal.

The display data may represent the trend of change of the recovery time using multiple sets of sample data. The multiple sets of sample data may be data based on the fridge's log information that have been gotten at multiple different points in time.

The display data may represent the trend of change of the power consumption using at least three sets of sample data.

The display data may represent the trend of change of the recovery time that indicates how long it takes for the inside temperature to recover the preset operating temperature in a situation where room temperature and the inside temperature maintain a constant relation since the fridge's door was closed.

Each set of sample data may be a set of data which has been gotten at the same room temperature and at the same inside temperature and which is based on the fridge's log information.

The display data may include information about the number of revolutions of a drive system for the fridge.

The fridge may have a filter, and the multiple sets of sample data may include information about cleaning history of the filter.

A data providing method according to yet another aspect of the present disclosure is carried out by a computer built in a data processing system which is designed to collect log information from electronic devices through a network and provide services based on that log information for authenticated users. The data providing method includes: receiving a fridge's log information through the network; generating display data, representing a trend of change of the power consumed since the fridge's door was closed and until the fridge's inside temperature recovered its preset operating temperature, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; providing the display data for an authenticated user's display terminal; and if the power consumption has exceeded a predetermined value, further providing maintenance information about the fridge's maintenance for the display terminal.

The display data may represent the trend of change of the recovery time that indicates how long it takes for the fridge's inside temperature to recover the preset operating temperature if room temperature and the inside temperature maintain a constant relation since the fridge's door was closed.

The maintenance information may be included in the display data.

If the power consumption is increasing compared to past history included in the fridge's log information and if the recovery time it takes for the inside temperature to reach the preset operating temperature since the fridge's door was closed has exceeded the predetermined amount of time, the maintenance information may be further provided for the display terminal.

The data providing method may include: finding at least one more fridge which has been manufactured in the same lot as the fridge by reference to a database in which information about fridges' defects is accumulated on a lot-by-lot basis; further spotting another fridge, in which the power consumption exceeds the predetermined value, from the at least one more fridge that has been found; and providing maintenance information associated with information about the defect of that another fridge that has been spotted.

The fridge may have a sensor to detect the amount stored in the fridge. If the power consumption has exceeded the predetermined value and if the amount stored in the fridge that has been detected by the sensor has exceeded a certain limit, the data providing method may include sending a message saying that the power consumption has exceeded the predetermined value due to the fact that the amount stored in the fridge has exceeded the certain limit to the display terminal. But if the power consumption has exceeded the predetermined value and if the amount stored in the fridge that has been detected by the sensor is equal to or smaller than the certain limit, the data providing method may include providing maintenance information about the fridge for the display terminal.

A data providing method according to yet another aspect of the present disclosure is carried out by a computer built in a data processing system which is designed to collect log information from electronic devices through a network and provide services based on that log information for authenticated users. The data providing method includes: receiving a fridge's log information through the network; generating display data, which is at least one of image data and audio data representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of the ambient surrounding the fridge, (iii) a temperature inside the fridge, and (iv) opening and closing history of the fridge; and providing the display data for an authenticated user's display terminal.

The display data may represent the trend of change of the recovery time that indicates how long it takes for the fridge's inside temperature to recover the preset operating temperature if room temperature and the inside temperature maintain a constant relation since the fridge's door was closed.

The information about the temperature of the ambient surrounding the fridge may be either the temperature of a room in which the fridge is installed or the temperature of the outside air at a location where the fridge is installed.

The data providing method may include generating, if the fridge's log information has been detected under a predefined abnormal condition, notification data and providing the notification data for a preregistered display terminal.

The data providing method may include: finding at least one more fridge which has been manufactured in the same lot as the fridge by reference to a database in which information about fridges' defects is accumulated on a lot-by-lot basis; further spotting another fridge, in which the recovery time exceeds the predetermined amount of time, from the at least one more fridge that has been found; and providing at least one of maintenance information associated with information about the defect of that another fridge that has been spotted and information about a new fridge.

Embodiments of a data providing method according to the present invention to be carried out in a data processing system will now be described with reference to the accompanying drawings.

Each of the embodiments to be described below shows a specific example of the present disclosure. The numerical values, shapes, components, steps and order of steps to be adopted in those embodiments are just examples and are never intended to limit the scope of the technique of the present disclosure. Also, among the components to be mentioned in the following description of embodiments, components which are not described in any independent claim at the time of filing of the present application will be described as arbitrary components. Furthermore, what will be described herein as embodiments of the present disclosure may be used in any arbitrary combination.

1. Outline of Services Provided

First of all, the services provided by a service providing system according to an embodiment of the present disclosure will be described. In this description, the "service providing system" will be sometimes hereinafter referred to as a "data processing system".

In this description, the terms are defined as follows:

Electronic device refers herein to a device which uses electric power for its heat source, light source or power source.

Examples of electronic devices: in this description, a typical example of the electronic device is a fridge. The "fridge" refers herein to a device with only a refrigerating function, a device with only a freezing function, or a device with both of these functions among various consumer electronic devices. In the following description of embodiments, the fridge is supposed to be a device with both the freezing function and the refrigerating function for the sake of convenience. However, this is only an example, and the fridge may also be a device with only the refrigerating function or a device with only the freezing function. Examples of fridges to which the present disclosure is supposed to be applied include fridges to be installed in a general household, fridges to be used for business (such as a fridge to be installed in a guest room of a hotel or a fridge to be installed at a factory), and fridges to be used outdoors (such as an automatic vending machine and a fridge as equipment for a car (i.e., a refrigerated car).

Log information refers herein to a record concerning the processing or operation that the electronic device has performed and the manipulations that the user has made on the electronic device. The log information may include various kinds of information that can be obtained from the electronic device such as information about the operation status or operation date and time of the electronic device.

Examples of the log information: a fridge's log information includes: information about the preset operating temperature inside the fridge; information about the ambient surrounding the fridge; information about the temperature inside the fridge; information about opening/closing history of the fridge (including the dates and times and/or the number of times of opening and closing): information about the number of revolutions of a drive system (such as a compressor's motor) for the fridge; and information about cleaning history of the fridge's filter.

Examples of log information of electronic devices other than fridge include the viewing history of TV programs, the recording schedule of a recorder, the date and time of operation of a washing machine and the load of laundry put into the washing machine.

User refers herein to a person who uses the service providing system, more specifically, a person who is provided with a result of analysis of the log information using the service providing system. In a general household, the head of the family who signed the contract with a service providing system may be the "user". For business use, on the other hand, a company, corporation or natural person who signed the contract with a service providing system may be the "user". If a general household, the "user" is the person who owns the electronic device, of which the log information will be given out, and the family members (including the "user" him- or herself) are the persons who use that electronic device. The "user" should originally be different from the person who uses the electronic device. In embodiments of the present disclosure, however, the "user" is supposed to be the same as the person who uses the electronic device (fridge) for convenience sake.

FIG. 1(A) outlines the service provided by a service providing system 1 according to this embodiment. This service providing system 1 includes a user group 1000, a data center operating company 1100, and a service provider 1200.

The user group 1000 may be a company, an association or a household, for example, and may have any size. The user group 1000 includes a plurality of devices 1010 including first and second devices and a home gateway 1020. Each of the plurality of devices 1010 has a telecommunication function and can transmit and receive data to/from other devices. The plurality of devices 1010 may include devices with configuration and ability to be connected directly to the Internet and devices without such configuration or ability. Examples of devices of the former type include smartphones, tablet terminals, dedicated display terminals, personal computers (PCs) and TV sets. Examples of the devices of the latter type include illuminators, washing machines and fridges. As can be seen, there may be a plurality of devices which can be connected to the Internet through the home gateway 1020. The plurality of devices 1010 in the user group 1000 may be used by one or more users 10. It should be noted that the users 10 are illustrated just for the sake of convenience and actually do not form part of this service providing system 1.

The home gateway 1020 receives log information about the device's operation from each of the plurality of devices 1010 and transmits the log information to a cloud server 1110. The home gateway 1020 accumulates the log information and feeds that log information accumulated to the cloud server 1110 once a day, for example.

Although only one home gateway 1020 is illustrated in FIG. 1(A), this is only an example. Alternatively, there may be a plurality of home gateways. If there are a number of home gateways, one of those home gateways may be connected to an external network (and which will be hereinafter referred to as a "master home gateway") and the other home gateways (which will be hereinafter referred to as "slave home gateways") may be connected to the master home gateway. Each of the slave home gateways receives and accumulates log information from one or more of the devices 1010 and uploads the log information to the server through the master home gateway. Alternatively, each slave home gateway may output a signal to operate one or more of the devices 1010 through the master home gateway.

The data center operating company 1100 includes the cloud server 1110, which is a virtualization server that operates in cooperation with various devices through the Internet, for example. The cloud server 1110 manages a group of data of huge sizes that are too big to handle with any existent general technology (i.e., so-called "big data") such as an ordinary database management tool. The data center operating company 1100 makes data management, management of the cloud server 1110 and operates a data center that makes those managements. The role played by the data center operating company 1100 will be described in detail later.

The data center operating company 1100 does not have to be a company which makes only the data management or manages the cloud server 1110. FIGS. 1(B) and 1(C) illustrate modified examples of the data center operating company 1100. FIG. 1(B) illustrates a device manufacturer which functions as the data center operating company 1100. If a device manufacturer which develops and manufactures devices included in the plurality of devices 1100 also exercises data management or manages the cloud server 1110, that device manufacturer corresponds to the data center operating company 1100. On the other hand, FIG. 1(C) illustrates a plurality of companies which together manage the cloud server 1110. As can be seen, the data center operating company 1100 does not have to be a single company. If a device manufacturer and another management company work either together or independently of each other to make data management and manage the cloud server 1110, both of them correspond to the data center operating company 1100. It should be noted that even if a device manufacturer and another management company work either together or independently of each other to make data management and manage the cloud server 1110, only the device manufacturer or the management company may function as the data center operating company 1100. Optionally, the data center operating company 1100 may function as a service provider as well.

The cloud server 1110 may be implemented as not only a piece of hardware such as a computer but also a piece of software in which the function that the cloud server 1110 needs to have is programmed.

The service provider 1200 has a server 1210. In this description, the "server" 1210 refers herein to a computer or storage medium with the ability to provide either data or services based on that data. As long as the server 1210 has that ability, its size is not particularly limited. For example, considering that data can be provided using a person's PC, either that person's PC itself or a storage medium such as a memory built in the person's PC may also be a "server". In some cases, the service provider 1200 may have no servers 1210.

It should be noted that the home gateway 1020 is not an essential component for the server providing system 1 described above. For example, if the cloud server 1110 manages every piece of data, no home gateway 1020 is needed. Also, if each and every device in a household has configuration and function to be connected to the Internet (i.e., if there are no devices that cannot be connected to the Internet by themselves), the home gateway 1020 may also be omitted. In that case, the log information may be given out directly to the cloud server 1110 by a plurality of devices 1010 through the Internet.

Next, it will be described how and where information flows in this service providing system 1.

First of all, either the first or second device in the user group 1000 transmits its own log information to the cloud server 1110 in the data center operating company 1100. In response, the cloud server 1110 receives and accumulates the log information that has been sent by the device (as indicated by the arrow 1310 in FIG. 1(A)).

Next, the cloud server 1110 of the data center operating company 1100 feeds the log information accumulated on a constant unit basis to the service provider 1200. In this case, the "constant unit" may be either a unit on which the data center operating company 1100 can sort out the information accumulated and feed it to the service provider 1200 or a unit required by the service provider 1200. Sometimes the log information may not be fed on a constant unit basis. Rather, depending on the situation, the amount of log information fed may vary. The log information is saved as needed in the server 1210 that the service provider 1200 has (as indicated by the arrow 1320 in FIG. 1(A)).

The service provider 1200 sorts out the log information into a type of information that matches the service to be provided for the users, and provides that information for the users. The users to be provided with that information may be either the users 10 who own the plurality of devices 1010 or external users 11. As to how to provide information for the users 10, 11, the service provider 1200 may directly provide information for the users 10, 11 (as indicated by the arrows 1330 and 1340 in FIG. 1(A)). Or the information may be provided for the users 10 by way of the cloud server 1110 of the data center operating company 1100 again (as indicated by the arrows 1350 and 1360 in FIG. 1(A)). Still alternatively, instead of the service provider 1200, the cloud server 1110 of the data center operating company 1100 may sort out the log information into a type of information that matches the service to be provided for the users, and feed that information to the service provider's (1200) computer.

It should be noted that the users 10 may or may not be identical with the users 11. Also, not all of the plurality of devices 1010, the cloud server 1100 and the server 1210 have to be installed in the same country. For example, all of the plurality of devices 1010 may be installed in Japan, but the cloud server 1110 and/or the server 1210 may be installed in the United States, or vice versa. If at least one of the cloud server 1110 and server 1210 provides a result of analysis in response to the user's manipulation (or control) and if the user can check out the result of analysis on a PC, for example, it can be said that the user is enjoying the benefits of that system in his or her own country. In that case, it is substantially no different from a situation where the system is installed within a single country.

It should be noted that when the log information is collected (as indicated by the arrows 1310 and 1320 in FIG. 1(A)) and when the information is given out (as indicated by the arrows 1330, 1340, 1350 and 1360 in FIG. 1(A)), if the information includes any sensitive information with which respective users 10 can be identified, then that information could be abused. That is why this system may be operated so that no sensitive personal information to identify the respective users 10 (e.g., their names) is included in the log information. If that information to identify the respective users 10 is included, the device on the transmitting end may transmit that information after having encrypted it.

2. Details of Service Providing System According to Embodiment 1

2. 1. Outline of Service Providing System 50

Next, a service providing system according to this embodiment will be described with reference to FIG. 2 and drawings that follow it.

Figure 2:
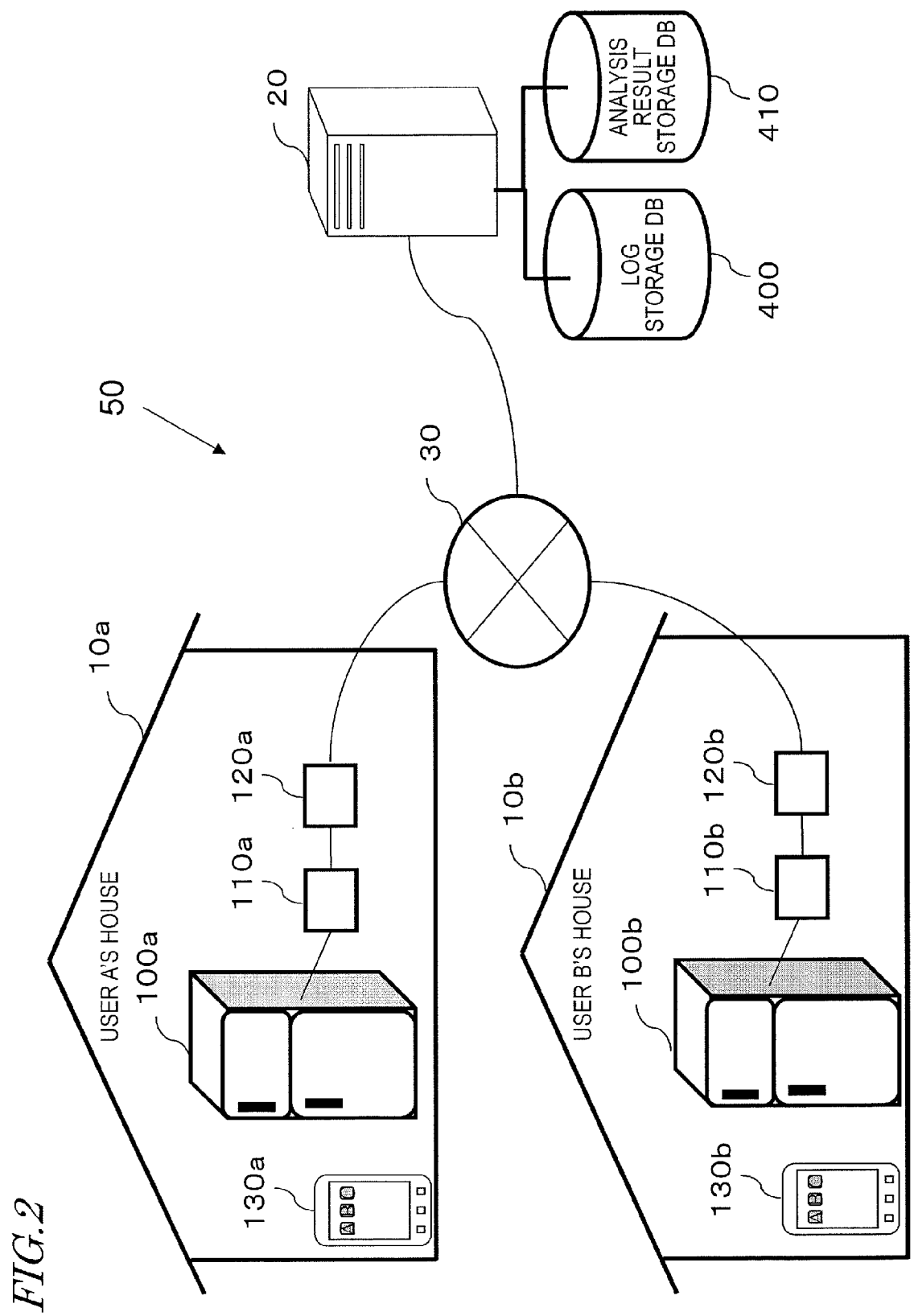
FIG. 2 Illustrates a configuration for a system according to an exemplary embodiment.

FIG. 2 illustrates a configuration for a service providing system 50 according to this embodiment. The fridges 100a and 100b shown in FIG. 2 may be included in the plurality of devices 1010 shown in FIG. 1(A). Meanwhile, the management server 20 shown in FIG. 2 corresponds to the cloud server 1110 shown in FIG. 1.

The management server 20 of this service providing system 50 collects the log information of electronic devices which are installed in the User A's and User B's houses 10a, 10b (e.g., the fridges 100a and 100b) through an information communications network 30 (which will be hereinafter simply referred to as a "network 30"). And in response to an access using a mobile telecommunications terminal 103a, 103b that is a display terminal each User A or B owns, the management server 20 allows the access by identifying User A or B with a contractor, and provides the authenticated user's display terminal with his or her display data, which is generated by the management server 20. More specifically, the management server 20 generates display data representing a trend of change of a recovery time that indicates how long it takes for the fridge's inside temperature to recover a preset operating temperature since the fridge's door was closed by reference to pieces of information which are included in the fridge's log information collected and which indicate (i) the preset operating temperature inside the fridge, (ii) the temperature of the ambient surrounding the fridge (such as the temperature of the room in which the fridge is installed), (iii) a temperature inside the fridge, and (iv) opening and closing history of the fridge.

As a result, a general user can sense more easily a sign of the limit of his or her fridge's life. For example, if the display data provided for the display terminal indicates that the recovery time is increasing, the user can see that his or her fridge's life is close to a limit. In addition, if the recovery time is increasing, more power would be consumed, compared to when the user purchased the fridge, until the fridge's inside temperature that has once changed due to the opening or closing of the door recovers its preset operating temperature. That is why in that case, it is easy to prompt the user to take an appropriate action to avoid wasting power such as asking the manufacturer to repair it or buying a new one. Consequently, the power can be saved.

It should be noted that the "display data" means data that needs to be used to generate an object to be displayed. For example, the "display data" may be data that can be restored and displayed as it is such as image data. The "display data" may also be mere numerical value data. If the display terminal receives the numerical value data and generates a user interface which is an object to be displayed, then the numerical value data can be said to be a sort of display data. Furthermore, the "display data" includes not only visual display data but also auditory display data as well. It will be described in detail later how the display data may be displayed.

Specific configurations will now be described. It should be noted that the User A's and User B's houses 10a and 10b shown in FIG. 2 may have the same configuration. That is why only the configuration of the User A's house 10a will be described for the sake of convenience.

2. 2. Configuration of Service Providing System 50

First of all, the configuration of the User A's house 10a will be described and the fridge 100a will be described in detail. Subsequently, the configuration of the management server 20 will be described. After that, it will be described how the fridge 100a, the management server 20 and other components operate in the service providing system 50.

2. 2. 1. User A's House 10a

A fridge 100a, a gateway 110a and a router 120a are provided for User A's house 10a. User A also owns a mobile telecommunications terminal 130a.

The fridge 100a has various sensors, and transmits log information that has been obtained using those sensors to the gateway 110a at a predetermined timing. The predetermined timing may be either when, or a certain period of time after, the log information is obtained, or may also be a time when the amount of log information temporarily accumulated in the memory (not shown) built in the fridge 100a exceeds a certain level.

The communication between the fridge 100a and the gateway 110a may be either a wired one or a wireless one. If a wired communication is carried out between them, a cable compliant with the Ethernet™ standard may be used. On the other hand, a wireless communication may be carried out between them via a specified low power radio station compliant with the IEEE 802.15.4d or IEEE 802.15.4g standard or may also be carried out compliant with the WiFi™ standard, the Bluetooth™ standard, or the Zig Bee™ standard.

The gateway 110a accumulates, in its internal storage device (not shown), the log information that has been received from the fridge 100a. The gateway 110a may transmit the accumulated log information to the management server 20 at a predetermined time once a day. Specifically, on receiving the log information to be transmitted from the gateway 110a, the router 120a generates a plurality of packets which designates the management server 20 as their destination and sends those packets to the management server 20 over a network 30. The network 30 may be a public line or a leased line that connects the management server 20 and the User A's house 10a together. In this embodiment, the network 30 is supposed to be a public line.

In this embodiment, the gateway 110a and the router 120a are provided as two separate devices. However, this is only an example. Alternatively, the gateway 110a may have a router function and the router 120a does not have to be provided separately as a single device.

Also, as already described with respect to the home gateway 1020 shown in FIG. 1, if the fridge 100a has configuration and ability to transmit log information directly over the network 30, the gateway 110a does not have to be provided.

The management server 20 includes a log storage database (DB) 400 and an analysis result storage database (DB) 410. The management server 20 receives the log information of the fridge 100a from the gateway 110a and stores it in the log storage DB 400. The log storage DB 400 and analysis result storage DB 410 will be described in detail later.

In response to User A's manipulation, the mobile telecommunications terminal 130a sends a request to display the performance of the User A's fridge 100a to the management server 20. Responsive to this request, the management server transmits display data to present information about the performance of User A's own fridge 100a (service information) to the mobile telecommunications terminal 130a. On receiving the display data from the management server 20, the mobile telecommunications terminal 130a presents the display data on the display screen. By looking at that fridge's (100a) performance information presented on the display screen, the user can understand the performance of his or her own fridge 100a.

Fridge's (100a) Specific Configuration

Next, a configuration for allowing the fridge 100a to get log information will be described with reference to FIGS. 3 to 5.

FIG. 3 illustrates a group of sensors provided for the fridge 100a.

The fridge 100a of this embodiment has a freezer compartment at the top and a refrigerator compartment at the bottom, and each of these two compartments has a door. And the same set of sensors is provided for each of the freezer and refrigerator compartments. Specifically, the fridge 100a includes door opening/closing sensors 250, 251, inside temperature sensors 270, 271, and storage sensors 290, 291.

Each of the door opening/closing sensors 250 and 251 senses that the door has been opened or closed. For example, the body of each of the refrigerator and freezer has a switch which is embedded to contact with the door closed and to turn ON and OFF as the door is opened and closed. That is to say, when the door is closed, the door switch is pressed and closed. On the other hand, when the door is opened, the door switch is out of contact with the door and opened. By sensing this door switch turn ON and OFF, log information about exactly when these doors were opened and closed, how many times of how often these doors have been opened or closed, and how long these doors were kept opened or closed can be obtained.

The inside temperature sensors 270 and 271 are existent sensors to sense the temperatures inside the freezer and refrigerator compartments, for example.

The storage sensors 290 and 291 may be optical sensors which are provided inside the freezer and refrigerator compartments, respectively, and monitor the status of the stuff stored inside this fridge (i.e., to sense the amount of stuff stored and their storage locations). On the ceiling of each of the freezer and refrigerator compartments, arranged is an LED lamp (not shown), for example. When the door is closed, the LED lamp irradiates the stuff inside the compartment with light from various different angles, and the storage sensor 290, 291 detects the illuminance of the light. The light is blocked by the stuff stored in the compartment. That is why if the status of the food stored there has changed, the illuminance of the light inside the compartment also varies. That is to say, by sensing the variation in the illuminance of the light that has been detected by the storage sensor 290, 291, the decision can be made whether the amount stored has increased or decreased.

Optionally, the storage sensors 290 and 291 may be cameras to shoot the stuff stored in the freezer and refrigerator compartments. In that case, the storage sensors 290 and 291 may each include an image processor and may monitor the storage status inside the compartment by analyzing the image that has been captured by the image processor.

The fridge 100a further includes temperature setting switches 260 and 261 to allow User A to set the temperatures inside the freezer and refrigerator compartments. The temperature setting switches 260 and 261 may allow the user to choose one of multiple refrigeration settings such as "low", "medium", "high" and "automatic". Alternatively, the temperature setting switches 260 and 261 may also be dial switches which allow the user to select a particular temperature setting. If "automatic" has been selected by turning the temperature setting switch 260, 261, the preset operating temperature inside the fridge 100a is automatically adjusted by the fridge's (100a) CPU as will be described later.

On the top plate of the fridge 100a, arranged is an outside temperature sensor 280 which detects the temperature of the ambient surrounding the fridge 100a. The ambient temperature may be an outside air temperature, for example, and is typically the temperature of a room in which the fridge 100a is installed.

The outside temperature sensor 280 is provided because the refrigeration performance of a compressor 202 (see FIG. 5) to be described later depends on the temperatures outside and inside the fridge. Suppose the temperature inside the fridge 100a is 10° C. when its door is closed and the target recovery temperature is 4° C. The operating condition of a heat pump unit when the outside air temperature is 28° C. is quite different from the condition when the outside air temperature is 15° C. In view of this consideration, the outside temperature sensor 280 is provided in this embodiment.

FIGS. 4(a) and 4(b) illustrate the position of a cleaning sensor 300 in the fridge 100a. FIG. 4(a) illustrates a front grill 320 which covers the cleaning sensor 300. FIG. 4(b) illustrates the cleaning sensor 300 which is accessible by removing the front grill 320 and a filter 310.

The cleaning sensor 300 may be either a switch which senses that the front grill 320 and the filter 310 have been removed or a button which senses that itself has been pressed by the user. The fridge 100a stores information about the timing of the last detection by the cleaning sensor 300. When a certain period of times passes since that timing of the last detection, the fridge 100a prompts the user to clean the filter 310 by blinking a lamp (not shown), for example. Depending on the result of detection obtained by the cleaning sensor 300, the fridge 100a decides that the filter 310 has been cleaned and resets the period counter into zero and starts counting the period all over again.

Figure 5:
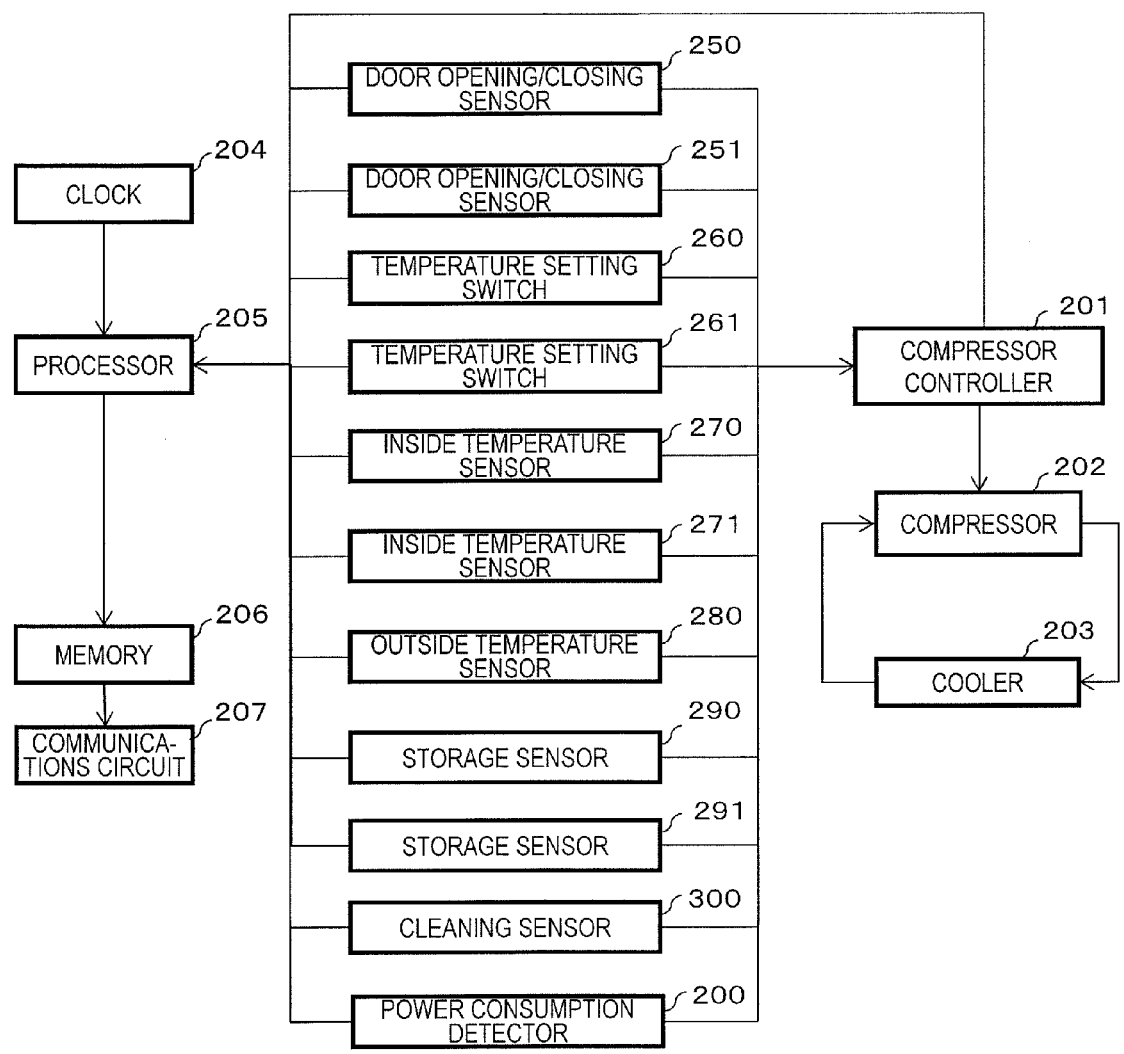
FIG. 5 A block diagram illustrating a configuration for a fridge according to an exemplary embodiment.

FIG. 5 illustrates a hardware configuration for the fridge 100a including those various sensors that have been described with reference to FIGS. 3 and 4. The fridge 100a includes not only those sensors but also a power consumption detector 200, a compressor controller 201, a compressor 202, a cooler 203, a clock 204, a processor 205, a memory 206 and a communications circuit 207.

The power consumption detector 200 is a circuit for detecting in real time the power being consumed by the fridge 100a, and may detect the power consumed by a power supply (not shown) for the fridge 100a, for example.

The compressor controller 201 controls the operation of the compressor 202. More specifically, the compressor controller 201 obtains information about the number of revolutions of a drive system (not shown) which is built as an integral component in the compressor 202 and transmits the information thus obtained to the processor 205. In this case, the "drive system" may be a motor, for example. In the following description, the drive system is supposed to be a motor.

The compressor 202 is a part which compresses the refrigerant in the heat-pump unit, and operates using a built-in motor. If the motor is run at high velocities, the refrigerant can be compressed quickly and the heat-pump unit's ability to increase cold air and heat generated by itself improves. On the other hand, if the motor is run at low velocities, the heat-pump unit's ability to increase cold air and heat declines. The cooler 203 is a part which cools the compressor 202. Specific configurations of the compressor 202 and cooler 203 are well known in the art, and description thereof will be omitted herein.

The clock 204 generates a clock signal to be a reference for collecting the log information, and supplies a signal representing the reference time to the processor 205.

The processor 205 is a circuit which controls the operation of the fridge 100a and which collects log information from those sensors shown in FIG. 5. The memory 206 temporarily stores the log information thus collected. And the communications circuit 207 is a wired or wireless telecommunications device which transmits the log information to the gateway 110a at a predetermined timing.

Figure 6:
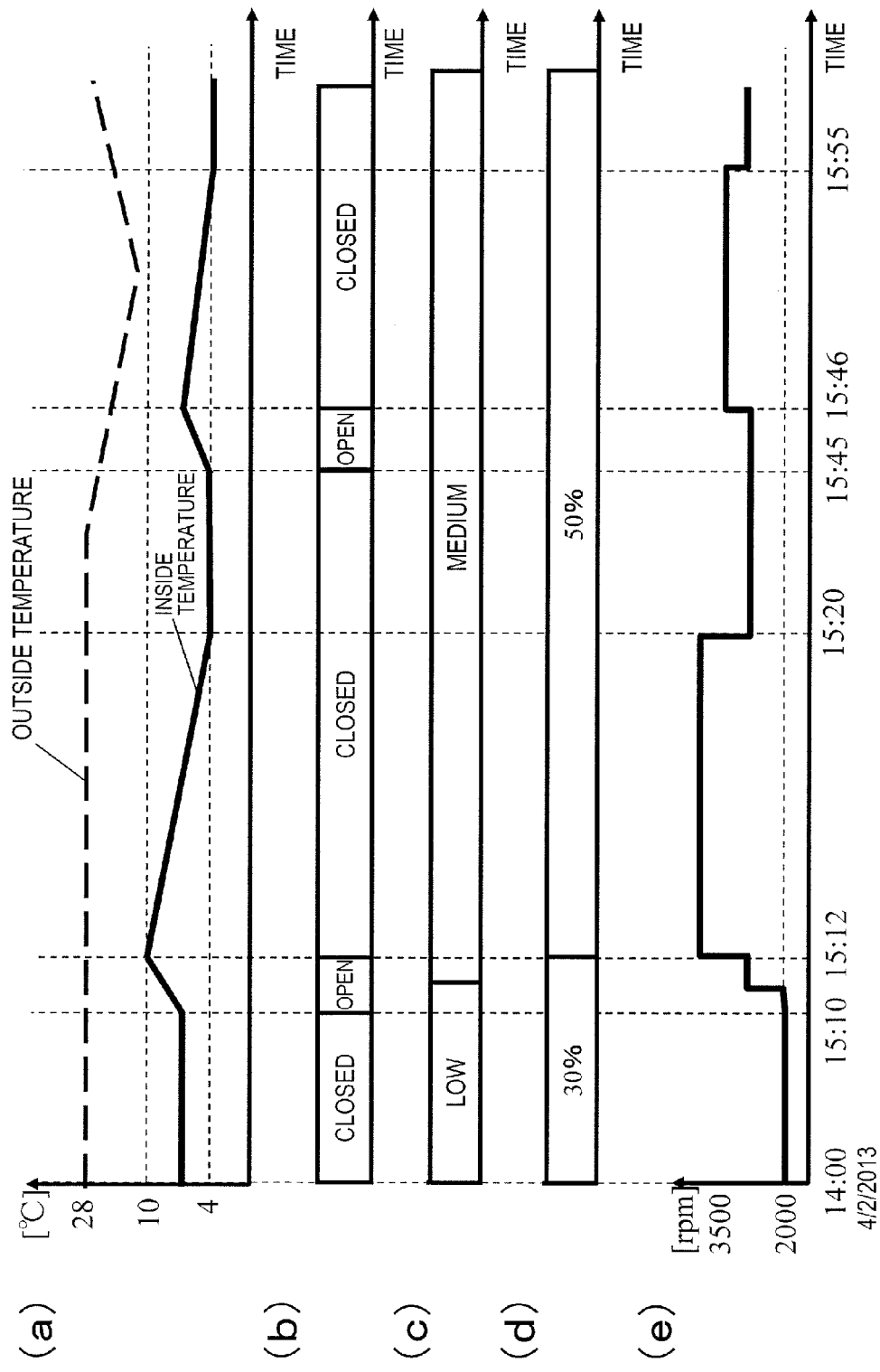
FIG. 6 (a) through (e) show exemplary pieces of operation log information that can be obtained from a fridge according to an exemplary embodiment.

Portions (a) through (e) of FIG. 6 show exemplary pieces of log information that can be obtained from the fridge 100a. In each of these portions, the abscissa represents the time.

Portion (a) of FIG. 6 shows log information about the outside and inside temperatures, which are indicated by a dashed-line graph and a solid-line graph, respectively. In the following description, the "inside temperature" is supposed to be the temperature inside the refrigerator compartment for the sake of convenience. Portion (b) of FIG. 6 shows log information about the opening and closing states of the door. Portion (c) of FIG. 6 shows log information about the temperature settings inside the fridge. Portion (d) of FIG. 6 shows log information about the storage status inside the fridge. And portion (e) of FIG. 6 shows log information about the number of revolutions of the motor that operates the compressor 202. In this case, the number of revolutions is indicated in revolutions per minute (rpm).

In these portions (a) through (e) of FIG. 6, multiple kinds of log information collected at particular points in time are summarized on the same sheet of paper to make the reader understand more easily how the system works. For example, look at the period of time from 15:10 through 15:20.

At 15:10, the door opening/closing sensor 251 senses that the door has been opened (see portion (b) of FIG. 6). Since the door has been opened, the inside temperature sensor 271 senses a rise in the temperature inside the fridge (see portion (a) of FIG. 6). Soon after that, the temperature setting switch 261 senses that the user has changed the inside temperature setting from "low" into "medium" (see portion (c) of FIG. 6).

Since the inside temperature has risen and since the user has changed the inside temperature setting, the number of revolutions of the compressor's motor increases. The compressor controller 201 senses the number of revolutions of the motor rise stepwise until the door is closed (see portion (e) of FIG. 6).

At 15:12, the door opening/closing sensor 251 senses that the door has been closed (see portion (b) of FIG. 6). Since the door has been closed, the storage sensor 291 senses that the storage status inside the fridge that had been 30% until the door was opened has changed into 50%. Meanwhile, the inside temperature sensor 271 senses a fall in the temperature inside the fridge (see portion (a) of FIG. 6). And when the inside temperature sensor 271 senses that the inside temperature has fallen to 4° C. corresponding to the "medium" degree of refrigeration at 15:20, the compressor controller 201 senses that the number of revolutions of the motor has decreased (see portion (e) of FIG. 6).

Next, it will be described how the system works in an exemplary situation where cleaning is performed.

Figure 7:
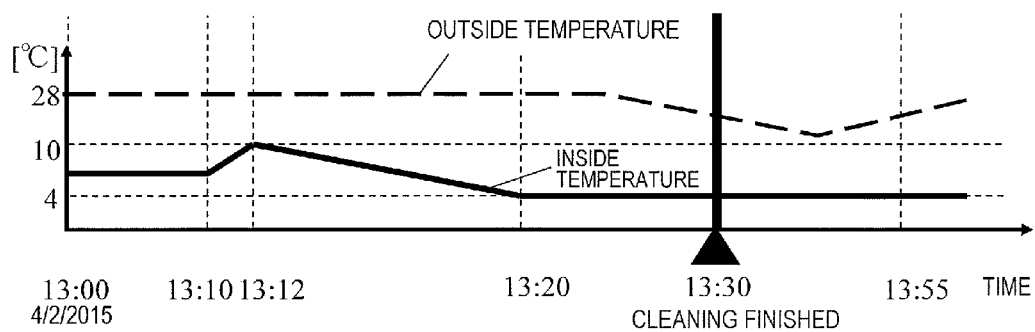
FIG. 7 Shows an example of log information about the fridge's cleaning history which can be obtained from the fridge according to the exemplary embodiment.

FIG. 7 shows log information about the outside and inside temperatures and log information obtained by the cleaning sensor 300. The user's manipulation tells the cleaning sensor 300 that cleaning of the filter 310 has been done by the user at 15:30. It should be noted that as the cooling efficiency improves since the filter 310 has been cleaned, the operation of decreasing the number of revolutions of the compressor's (202) motor may be performed. If such an operation has been performed, the compressor controller 201 will sense a decrease in the number of revolutions of the motor.

As described above, the results of detection obtained by those sensors are collected as pieces of log information by the processor 205 and accumulated in the memory 206.

2. 2. 2. Configuration of Management Server 20

Figure 8A:
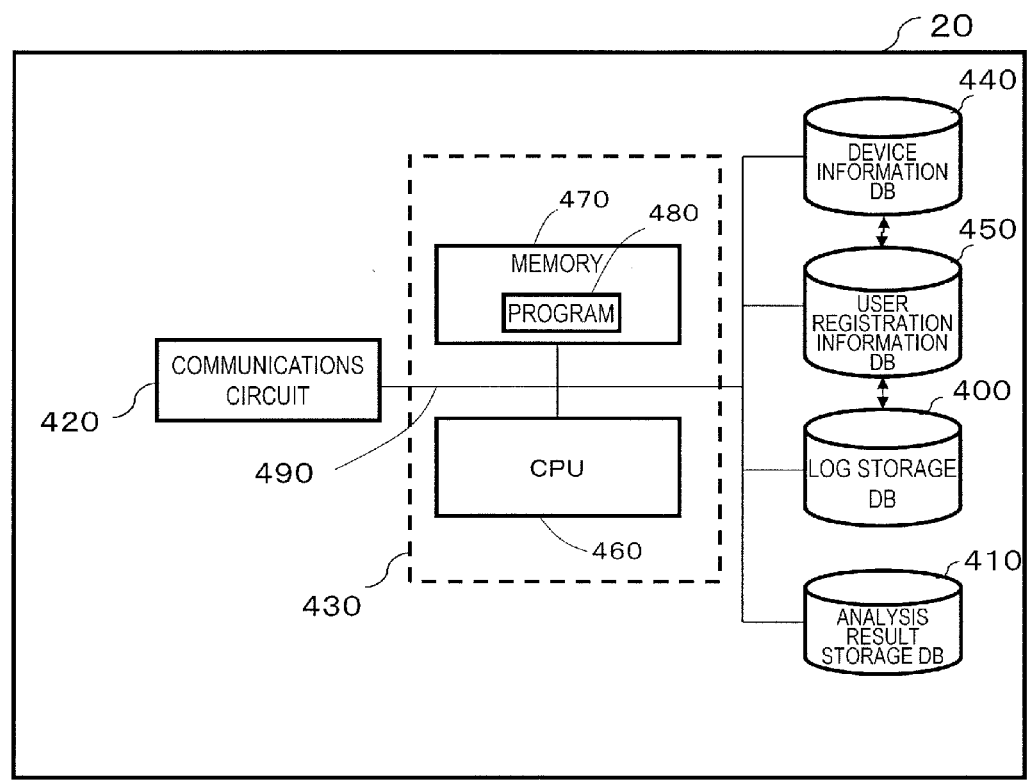
FIG. 8A A block diagram illustrating a hardware configuration for a server according to an exemplary embodiment.

FIG. 8A illustrates a hardware configuration for the management server 20, which includes multiple databases 400, 410, 440 and 450, a communications circuit 420, a CPU 460, and a memory 470. These components are connected together with a bus 490 and can exchange data with each other.

The communications circuit 420 communicates with other telecommunications devices (such as the router 120a shown in FIG. 2) over the network 30. The communications circuit 420 makes communications compliant with the Ethernet™ standard, for example.

The CPU 460 controls the operation of the management server 20, and performs a group of instructions which are described in the computer program 480 that has been loaded in the memory 470. As a result, the CPU 460 can perform various functions. The computer program 480 describes a group of instructions that should be carried out to allow the management server 20 to perform the sequences to be described later with reference to FIGS. 10 and 12, for example.

The computer program 35 may be circulated as a product on the market by being recorded on a storage medium such as a CD-ROM or downloaded through a telecommunications line such as the Internet. When loaded with the computer program 480, a device including the hardware shown in FIG. 8A (such as a PC) may function as a management server 20 according to this embodiment.

Optionally, the CPU 460 and the memory 470 that stores the computer program 480 may also be implemented as a piece of hardware such as a DSP (digital signal processor) in which a computer program has been installed in a single semiconductor circuit. Such a DSP can carry out all by itself (i.e., by a single integrated circuit) every processing to be performed by the CPU 460 when executing the computer program 480 described above. Thus, the CPU 460 and memory 470 shown in FIG. 8A may be replaced with such a DSP as the processor 430. Next, the functional configuration to be realized by the processor 430 will be described with reference to FIG. 8B. The processing to be carried out about the various databases shown in FIG. 8A will also be described.

Figure 8B:
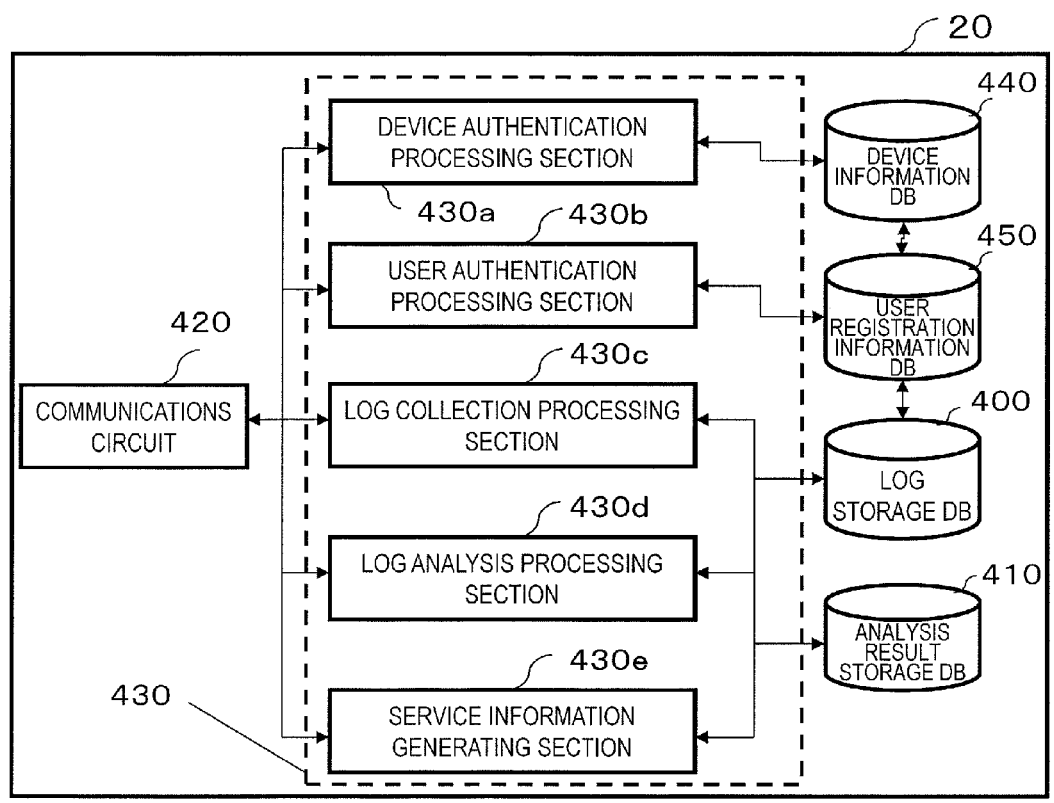
FIG. 8B A block diagram illustrating a functional configuration for a server according to an exemplary embodiment.

FIG. 8B is a block diagram illustrating a functional configuration of the management server 20. In FIG. 8B, any component also shown in FIG. 8A and having substantially the same function as its counterpart is identified by the same reference numeral as its counterpart's and description thereof will be omitted herein.

The management server 20 includes multiple databases 400, 410, 440 and 450, a communications circuit 420 and a processor 430.

In FIG. 8B, illustrated are five blocks of functions (namely, a device authentication processing section 430a, a user authentication processing section 430b, a log collection processing section 430c, a log analysis processing section 430d, and service information generating section 430e) to be performed by the processor 430. The CPU executing the software program functions as the device authentication processing section 430a at a certain point in time, and functions as the user authentication processing section 430b at another point in time. The same can be said about the other components. Optionally, at least one of these five functional blocks may be implemented as a piece of hardware which performs dedicated processing (such as a DSP).

The device authentication processing section 430a authenticates the device which generates and transmits log information at the user's house. The management server 20 receives only the log information of such a device at the user's house that has been authenticated by the device authentication processing section 430a. In making the authentication, the device authentication processing section 430a refers to a device information database (DB) 440, in which device information to identify a registered device uniquely is stored. The device information may be a device ID to be given by the manufacturer to each product, for example. Alternatively, the device information may also be an MAC (media access control) address which is given as a unique address to each piece of hardware functioning as a network device such as a communications circuit when communications are going to be carried out through the network 30.

In the device information DB 440, each device ID is associated with a product type ID which indicates the product type of that device and a lot number indicating the manufacturing lot of that device.

The user authentication processing section 430b verifies whether the user who is asking the service providing system 50 for the service information is an authentic user (i.e., whether he or she is really a person who signed the contract with the system). The management server 20 communicates with only the user who has been authenticated by the user authentication processing section 430. In making the authentication, the user authentication processing section 430b refers to a user registration information database (DB) 450, in which information to identify a registered user uniquely is stored.

The log collection processing section 430c classifies the log information that has been received via the communications circuit 420 according to user or device and accumulates the information in a log storage DB 400.

The log analysis processing section 430d analyzes the log information accumulated in the log storage DB 400 with respect to a particular user's particular device and generates a result of analysis. Then, the log analysis processing section 430d stores the result of analysis in an analysis result storage DB 410 on a user-by-user basis and on a device-by-device basis.

The service information generating section 430e extracts one or more analysis results with respect to a particular device by reference to the analysis result storage DB 410, thereby generating information to be presented to the user (i.e., service information).

In FIGS. 8A and 8B, the management server 20 is illustrated as including multiple databases 400, 410, 440 and 450. However, this is only an example. Alternatively, at least one of these databases 400, 410, 440 and 450 may be provided outside of the management server 20. For example, at least one of these databases 400, 410, 440 and 450 may be connected to the network 30 and may function as a database server. In that case, the database may be provided to communicate with the management server 20 and allow the processor 430 to provide any piece of necessary information.

It should be noted that the device information DB 440, user registration information DB 450 and log storage DB 400 are associated with each other. As a result, when a particular device's log information is received, the log information can be accumulated systematically.

Figure 9:
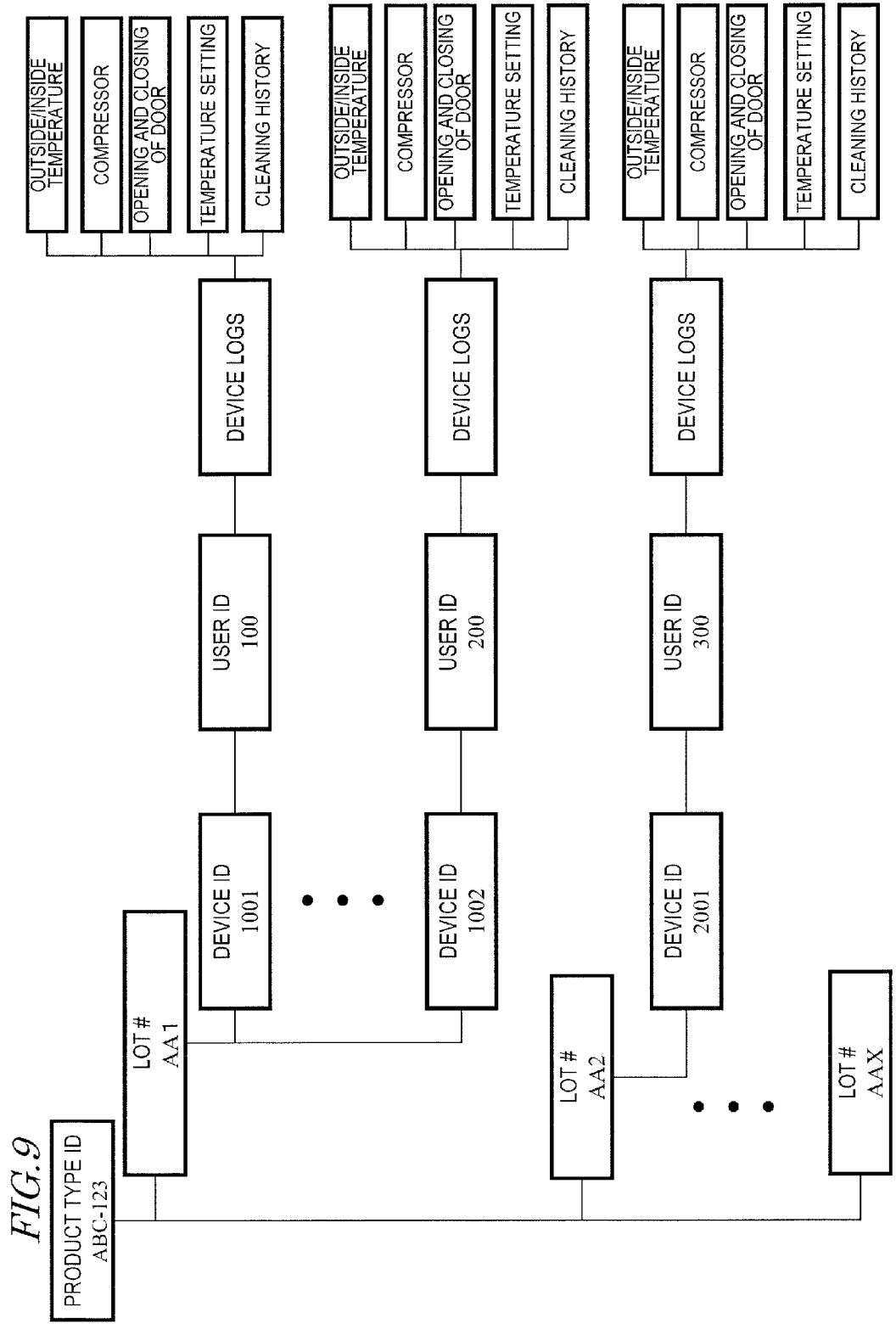
FIG. 9 Illustrates an exemplary configuration #1 for a DB which stores the operation logs of a fridge to be managed by a server in an exemplary embodiment.

FIG. 9 shows exemplary pieces of devices' information which are associated with each other by reference to the device information DB 440, user registration information DB 450 and log storage DB 400 shown in FIGS. 8A and 8B. The product type IDs, lot numbers, and device IDs shown in FIG. 9 have been sorted out by reference to the device information DB 440. The user IDs to identify the users have been sorted out by reference to the user registration information DB 450. The devices' log information (including pieces of more specific information under the "device logs" shown in FIG. 9) has been sorted out by reference to the log storage DB 400. The log information is managed by associating these pieces of information with each other as shown in FIG. 9.

2. 2. 3. Log Information Collecting Operation by Service Providing System 50

FIG. 10 shows the sequence of communications to be carried out between the fridge 100a and the management server 20 when the fridge's (100a) log information is collected by the management server 20.

In Step S1, the processor 205 of the fridge 100a (see FIG. 5) collects the log information at a predetermined rate and accumulates it in the memory 206 (see FIG. 5). The predetermined rate may be once a minute or once every ten seconds, for example. But the rate may also be set to be any other appropriate one.

In Step S2, when the data size of the log information accumulated in the memory 206 reaches a predetermined threshold value, the processor 205 makes the communications circuit 207 (see FIG. 5) output a device authentication request in order to transmit the log information to the management server 20. This device authentication request is transmitted to the management server via the GW 110a and the router 120a. If the device authentication processing section 430a of the management server 20 verifies that the fridge 100a is a registered device, the sequence advances to Step S3.

In Step S3, the communications circuit 207 of the fridge 100a (see FIG. 5) transmits the log information to the gateway (GW) 110a.

In Step S4, the GW 110a receives the log information. Next, the GW 110a encrypts the log information in Step S5 and then transmits the encrypted log information to the router 120a in Step S6. In response, the router 120a forwards the encrypted log information to the management server 20. Even though communications between the router 120a and the management server 20 are supposed to be carried out in this embodiment by the packet exchange method, packetize processing and depacketize processing may also be carried out by any other known method. Thus, detailed description of that processing will be omitted herein.

In Step S7, the communications circuit 420 of the management server 20 (see FIGS. 8A and 8B) receives the encrypted log information. The log collection processing section 430c decodes the encrypted log information in Step S8 and then accumulates the log information thus obtained in the log storage DB 400 in Step S9.

In Step S10, the log analysis processing section 430d analyzes the log information. The analysis of the log information is carried out on respective fridges and on the common lot between those fridges. Then, in Step S11, the log analysis processing section 430d stores the results of analysis in the analysis result storage DB 410. Thereafter, the communications circuit 420 of the management server 20 sends a notification that the log information has been received and accumulated successfully to the fridge 100a. Alternatively, the communications circuit 420 of the management server 20 may send this notification when the processing step S9 is done.

As a result of the processing described above, pieces of log information and analysis results are accumulated one after another in the log storage DB 400 and analysis result storage DB 410.

In the embodiment described above, the GW 110a is supposed to encrypt the log information. However, this is only an example. Alternatively, the fridge 100a may perform the encryption processing and transmit the encrypted log information to the GW 110a. In that case, the GW 110a may just forward the encrypted log information that has been received from the fridge 100a to the management server 20 without subjecting the encrypted log information to any particular processing.

2. 2. 4. Analysis of Log Information by Service Providing System 50

FIG. 11 shows results of analysis based on the operation log information that has been collected by the management server 20 from the fridge 100a as stored in the analysis result storage DB 410. Conditions are described in association with a device ID and a lot number, and the results/trends when those conditions are satisfied are described there.

For example, take a look at the upper two rows R1 and R2. The conditions and results of R1 and R2 are pieces of information about the total operation hours and refrigeration efficiency that were collected by a maintenance person when he or she visited users' houses. In addition, it was also collected as an additional piece of information whether or not any failure occurred when those conditions were satisfied.

Next, look at the lower two rows R3 and R4. The data on these rows does not have to be pieces of information that were collected by a maintenance person. For example, a developer who works for the maker of the refrigerator may define the relation between the amount stored and the power consumption as data, or may also define the relation between the period of time for which the filter 310 has not been cleaned and the power consumption as data.

2. 2. 5. Presentation of Analysis Results of Log Information

FIG. 12 shows the sequence of communications to be made when the service information that has been generated based on the log information of the fridge 100a is exchanged between a mobile telecommunications terminal 130a that is an exemplary display terminal and the management server 20. It should be noted that wireless communications may be carried out compliant with the WiFi™ standard, for example, between the mobile telecommunications terminal 130a and the router 120a. In FIG. 12, the router 120a is supposed to have only the ability to relay communications.

In Step S21, User A starts to run an application that has been installed in advance in the mobile telecommunications terminal 130a. Then, in Step S22, a dialog box prompting the user to enter his or her personal information to authenticate him or her (which will be hereinafter referred to as "user authentication information") is presented on the display screen of the mobile telecommunications terminal 130a. In response, the user enters the user authentication information, which may be his or her user ID and password.

In Step S23, the user authentication processing section 430b of the management server 20 (see FIG. 8B) sees, by reference to the user registration information DB 450, if there is any piece of user registration information that matches the user authentication information entered. If the answer is YES, the user authentication processing section 430b (see FIG. 8B) notifies the mobile telecommunications terminal 130a that User A has been authenticated successfully.

In Step S24, the application presents a menu on the display screen of the mobile telecommunications terminal 130a.

In Step S25, User A sends a request to indicate the performance of the fridge 100a (which will be hereinafter referred to as a "performance indication request"). The performance indication request is a request for information about the fridge's (100a) performance indicating the signs of a life limit of the fridge 100a and/or whether or not the fridge 100a needs maintenance.

The service information generating section 430e compares the analysis results to the log information of the user's house in Step S26, and then generates service information in Step S27. The service information generating section 430e outputs display data indicating the service information generated to the mobile telecommunications terminal 130a via the communications circuit 420.

In Step S28, the mobile telecommunications terminal 130a presents the service information display data thus received on its display screen.

In the example described above, it is not until the performance indication request is received that the management server 20 performs the processing steps S26 and S27. However, this processing is only an example. Alternatively, before the performance indication request is received, part of the service information generation processing (e.g., only the processing step S26) may be performed in advance. As a result, the processing of generating service information can be speeded up. However, if the processing that uses old log information were performed, then the performance would not be indicated accurately. For that reason, whenever a predetermined period of time passes, the processing step S26 may be updated. Optionally, the management server 20 may generate service information and send push notification to the mobile telecommunications terminal at the timing when the log is received and log information is analyzed, instead of the timing when the performance indication request is received.

Next, examples of service information performance indicators to be displayed on the mobile telecommunications terminal 130a will be described with reference to FIGS. 13 to 16 and FIG. 17.

FIGS. 13 to 16 and FIG. 17 show examples of fridge's performance indicator information to be displayed on the mobile telecommunications terminal 130a.

FIGS. 13 to 16 each show, using sample data that were collected at three or more points in time, the trend of change of the recovery time indicating how long it took for the fridge's inside temperature to recover its preset operating temperature since the fridge's door was closed in a situation where there was a constant relation between room temperature and the inside temperature. Specifically, the "situation where there was a constant relation between room temperature and the inside temperature" refers in this embodiment to a situation where room temperature was 28 and the inside temperature was 10° C.

Figure 13:
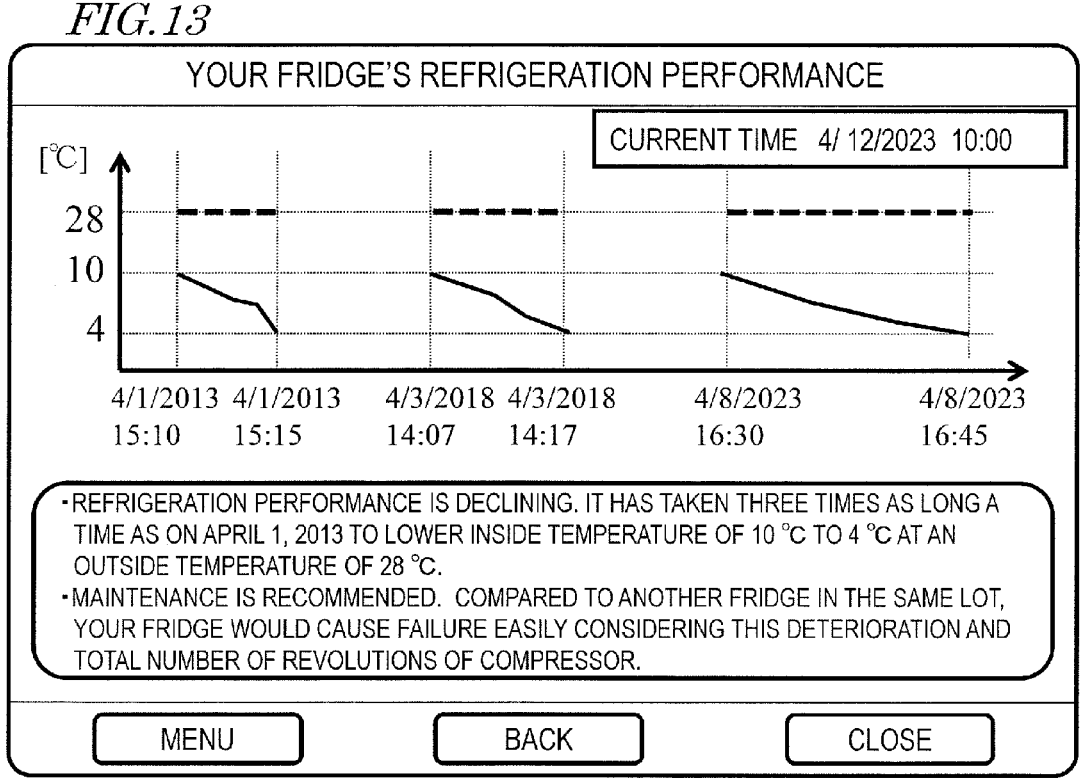
FIG. 13 Illustrates UI Sample #1 of the fridge's operation logs to be presented on the display terminal according to an exemplary embodiment.
Figure 14:
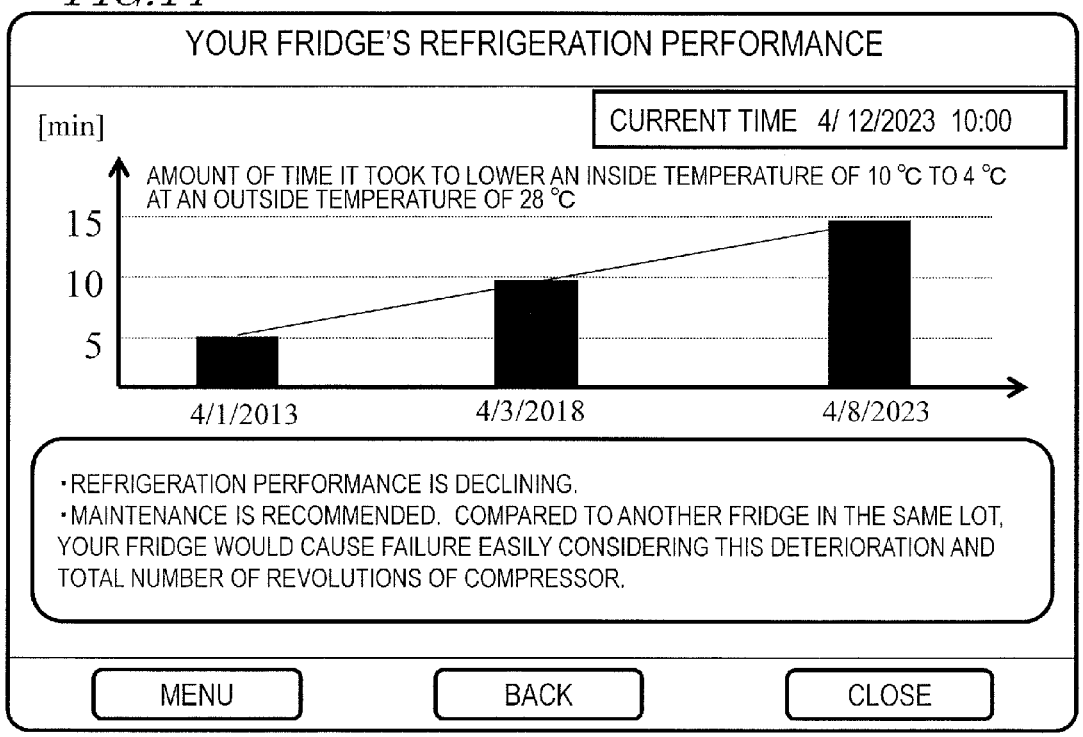
FIG. 14 Illustrates UI Sample #2 of the fridge's operation logs to be presented on the display terminal according to an exemplary embodiment.

For example, according to the data shown in FIGS. 13 and 14, it can be seen that the amount of time it took to lower the fridge's inside temperature of 10° C. to 4° C. at a room temperature of 28° C. was 5 minutes in 2013, but increased to 10 minutes in 2018, and to 15 minutes in 2023. By using such log information collected under the same environmental condition, the trend of change of the fridge's (100a) performance (i.e., a decline in the fridge's performance) can be presented to the user in an easily understandable form.

Figure 17:
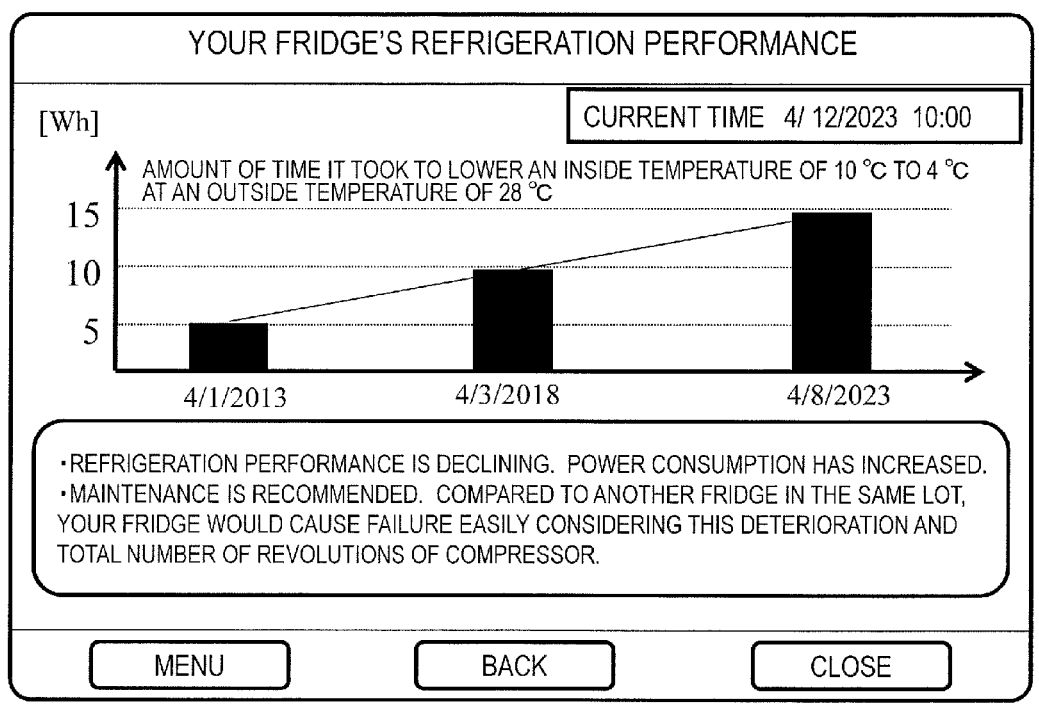
FIG. 17 Shows, using sample data that were collected at three or more points in time, the trend of change of the power consumed since the fridge's door was closed and until the fridge's inside temperature recovered its preset operating temperature in a situation where there was a constant relation between room temperature and the inside temperature in an exemplary embodiment.

On the other hand, FIG. 17 shows, using sample data that were collected at three or more points in time, the trend of change of the power consumed since the fridge's door was closed and until the fridge's inside temperature recovered its preset operating temperature in a situation where there was a constant relation between room temperature and the inside temperature.

By representing a trend of change using such sample data that were collected under the same environmental condition, it is possible to prevent the accuracy of sensing the signs of a refrigerator's life limit from decreasing. The reason is that since no sample data collected when there was a different relation between room temperature and the inside temperature is used, the trend of change hardly varies.

For example, imagine a situation where the user opens and closes the fridge's door a number of times in series during a short period of time. In such a situation, the user may open the fridge's door again before the fridge's inside temperature recovers its preset operating temperature. If the trend of change of the fridge's inside temperature is presented in such a situation, it can be seen that the recovery time it takes for the inside temperature to recover the preset operating temperature will increase. As a result, even though no maintenance is actually needed yet about the fridge's refrigeration performance, a performance indicative result recommending maintenance will be presented in such a situation. That is why data collected in such a situation where the fridge's inside temperature has not recovered its preset operating temperature yet (e.g., when the fridge's door is opened and closed a number of times during a short time) may be removed from the samples. In that case, it is possible to reduce the chances of making an erroneous decision about the signs of a refrigerator's life limit and about whether maintenance is needed or not.

In addition, if the amount of time it took for the fridge's inside temperature to reach the target value exceeded a predetermined time (of 11 minutes, for example), then the service information generating section 430e of the management server 20 also provides display data to present maintenance information recommending maintenance of the fridge 100a for the mobile telecommunications terminal 130a. User A checks out the service information available that is presented based on the display data provided for the mobile telecommunications terminal 130a. As a result, the user can make a right decision on what to do with his or her own fridge 100a without making mistakes. Consequently, it is possible to prevent User A from misunderstanding what the display data means and leaving the fridge 100a until the fridge 100a has its performance declined too much to operate properly anymore due to a failure.

Figure 15:
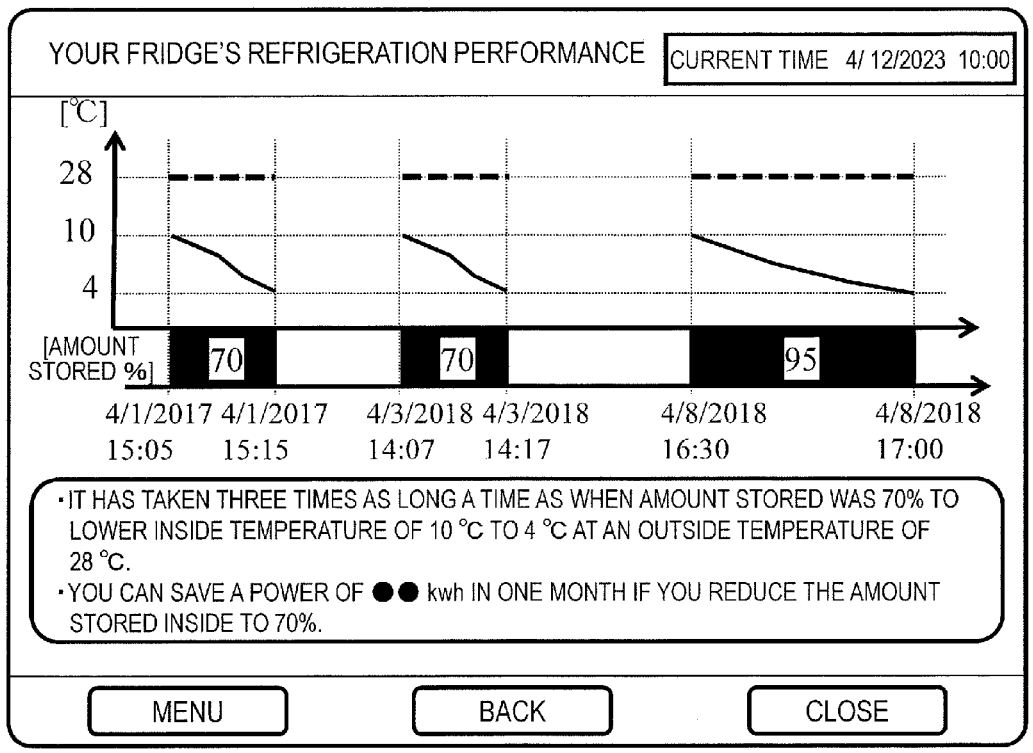
FIG. 15 Illustrates UI Sample #3 of the fridge's operation logs to be presented on the display terminal according to an exemplary embodiment.
Figure 16:
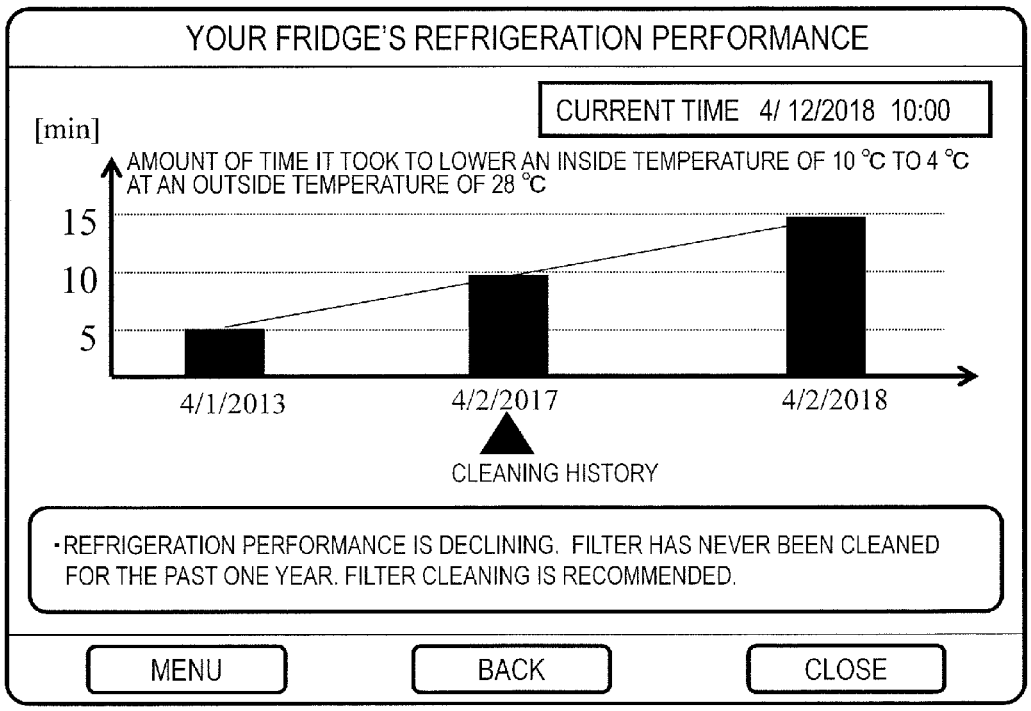
FIG. 16 Illustrates UI Sample #4 of the fridge's operation logs to be presented on the display terminal according to an exemplary embodiment.

Optionally, the user may be notified of a decline in refrigeration performance based on the amount stored inside the fridge and the cleaning history of the filter 310 as shown in FIGS. 15 and 16.

According to this embodiment, the management server 20 includes an analysis result storage DB 410 which can be used to manage information about the fridge's defects on a lot-by-lot basis as shown in FIG. 11. As a result, User A can be provided with maintenance information associated with the specific defects of another fridge which was manufactured in the same lot as the fridge 100a he or she uses and in which the recovery time exceeded the predetermined amount of time. Thus, the user can see, by reference to the product number and manufacturing serial number of the fridge 100a, how another product in the same lot as his or hers has deteriorated and caused failures and can determine whether or not his or her fridge 100a needs maintenance right now. Considering the fact that that product and his or her own product went through the same manufacturing process, his or her own fridge is highly likely to cause similar defects to those of another fridge in the same lot. Consequently, the user can be recommended to take appropriate action by being provided with maintenance information.

3. Details of Service Providing System According to Embodiment 2

According to the first embodiment described above, a single user is supposed to use the fridge 100a continuously. Based on the supposition, it has been described how either the recovery time, indicating how long it takes for a fridge's inside temperature to recover its preset operating temperature since the fridge's door was closed, or the power consumed since the door was closed and until the temperature recovers its preset operating temperature changes.

As for this second embodiment, on the other hand, an example in which a plurality of users are supposed to use the same electronic device (such as a fridge) in different periods of time will be described. This may mean that the same fridge is put on a second-hand market and used by multiple different persons.

Figure 18:
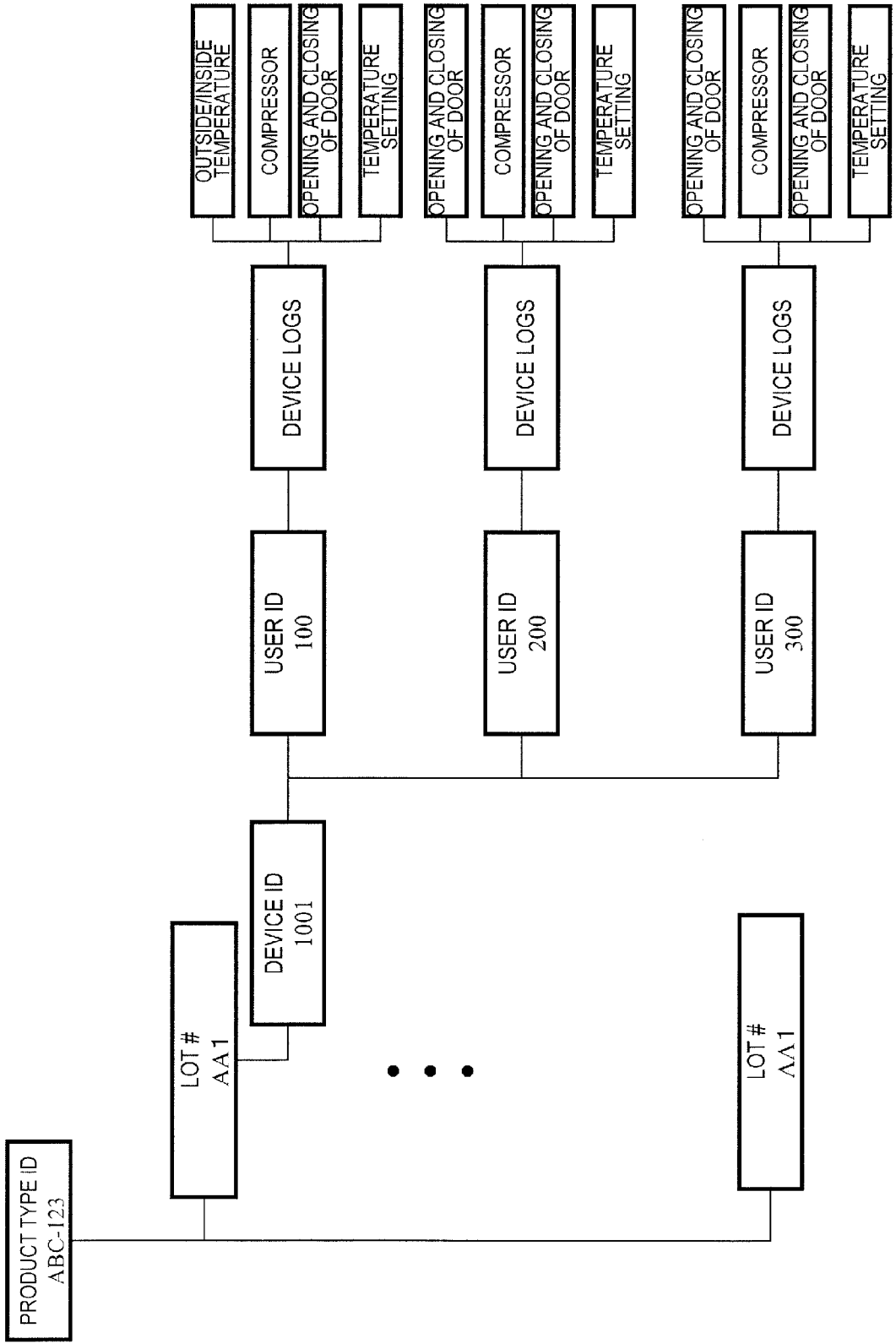
FIG. 18 Illustrates an exemplary configuration #2 for a DB which stores the operation logs of a fridge to be managed by a server in an exemplary embodiment.

FIG. 18 shows information about a single fridge owned by multiple different persons. As in FIG. 9, the device information DB 440, user registration information DB 450 and log storage DB 400 shown in FIGS. 8A and 8B are used in association with each other.

However, it can be seen that the fridge with the device ID "1001" has been owned by three different persons with the user IDs "100", "200" and "300", respectively. And its current owner is supposed to be a person whose user ID is "300", for example.

While the fridge was used by those three different persons whose user IDs are "100", "200" and "300", the log information was accumulated in the log storage DB 400 in association with those users.

Figure 19:
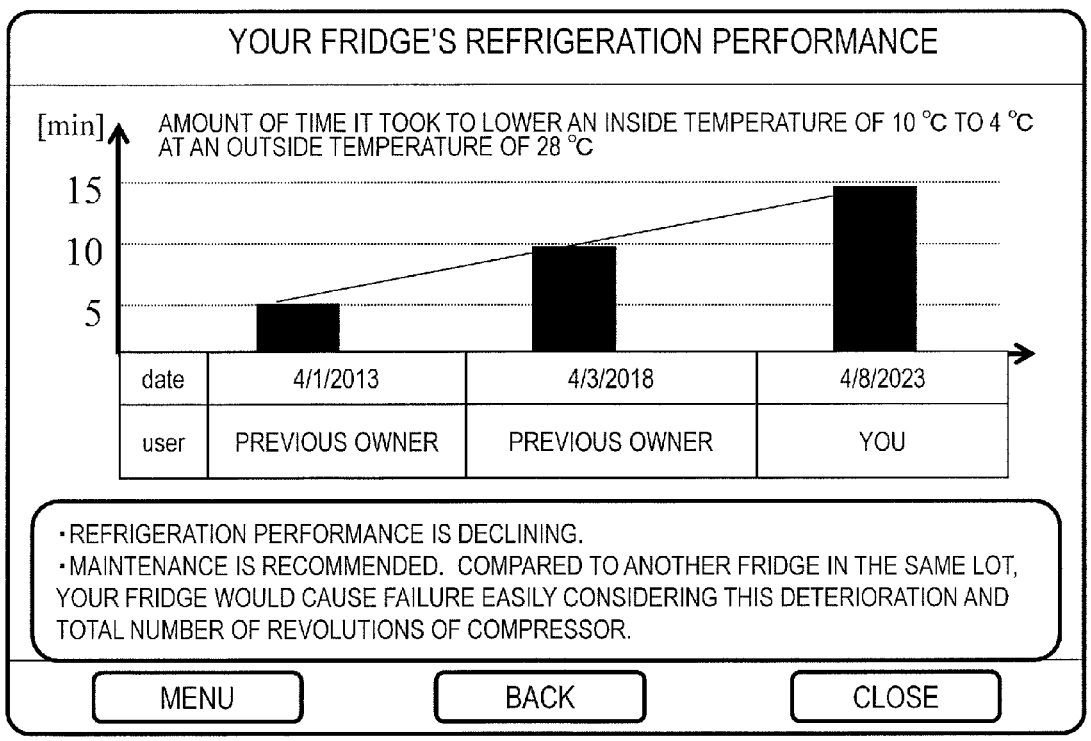
FIG. 19 Illustrates UI Sample #5 of the fridge's operation logs to be presented on the display terminal according to an exemplary embodiment.

FIG. 19 shows an example of a fridge's performance indicator information to be presented on the mobile telecommunications terminal 130a. As in FIG. 14, also shown in FIG. 19 is the amount of time it took to lower the fridge's inside temperature of 10° C. to 4° C. at a room temperature of 28° C. In FIG. 19, however, additional information about its owners is shown along with the periods of use, which is a difference from FIG. 14. It should be noted that the previous users are just called "previous owners" lest they should be identified by their names.

Figure 20:
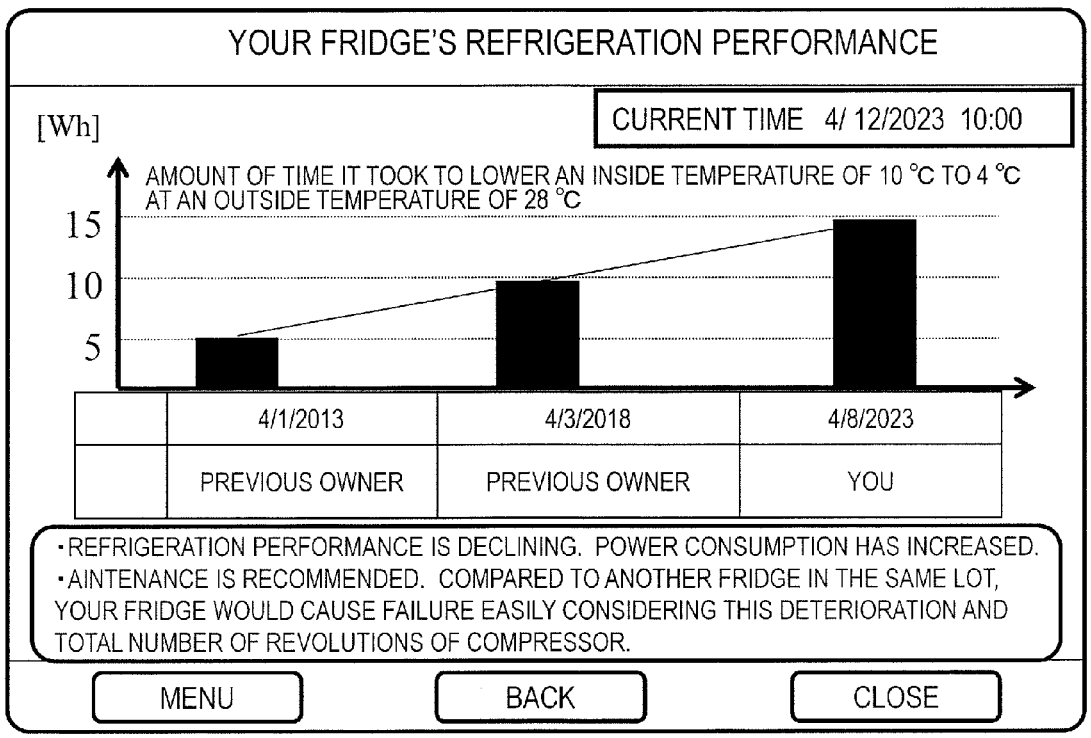
FIG. 20 Shows the trend of change of power consumption along with information about previous users.

FIG. 20 shows how the power consumption increased along with information about the previous users. What is shown in FIG. 20 is quite the same as what is shown in FIG. 17 except that information about the owners is shown as additional information along with the periods of use.

4. Types of Cloud Services to Implement Service Providing System

The technology that has been described for the embodiments may be implemented as the following types of cloud services. It should be noted that these types of cloud services are just examples and there can be other types of cloud services as well.

4.1. Service Type 1: Cloud Service Using In-House Data Center

Figure 21:
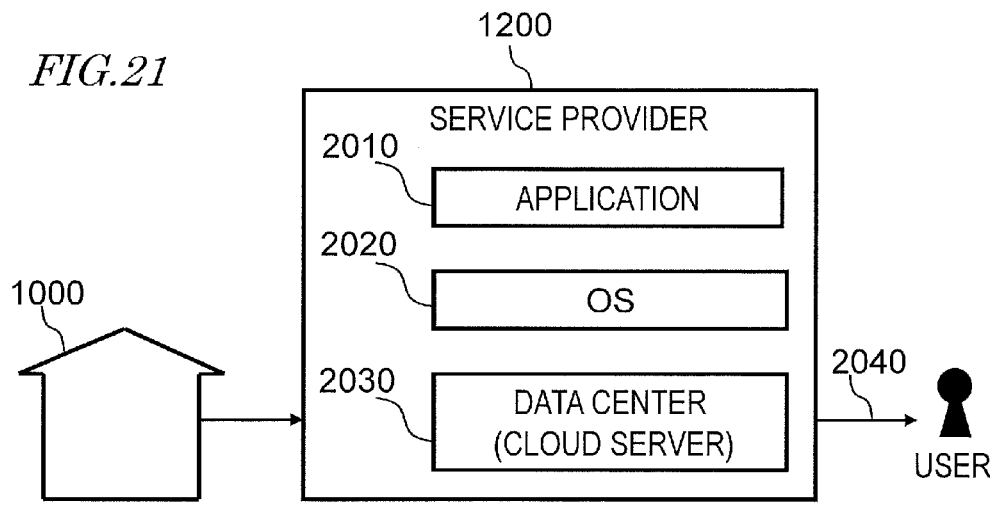
FIG. 21 Outlines the service provided by a system which uses Service Type 1 (cloud service using in-house data center).

FIG. 21 outlines the service provided by a service providing system which uses Service Type 1 (cloud service using in-house data center). According to this type, a service provider 1200 collects information from a user group 1000, and provides services for the user. According to this type, the service provider 1200 functions as a data center operating company. That is to say, the service provider 1200 owns a cloud server 1110 which manages big data. Thus, there is no data center operating company.

According to this type, the service provider 1200 operates and manages the data center (cloud server) 2030, and also manages an operating system (OS) 2020 and an application 2010. And the service provider 1200 provides services using the OS 2020 and application 2010 that are managed by the service provider 1200 by itself (as indicated by the arrow 2040

4.2. Service Type 2: Cloud Service Using IaaS

Figure 22:
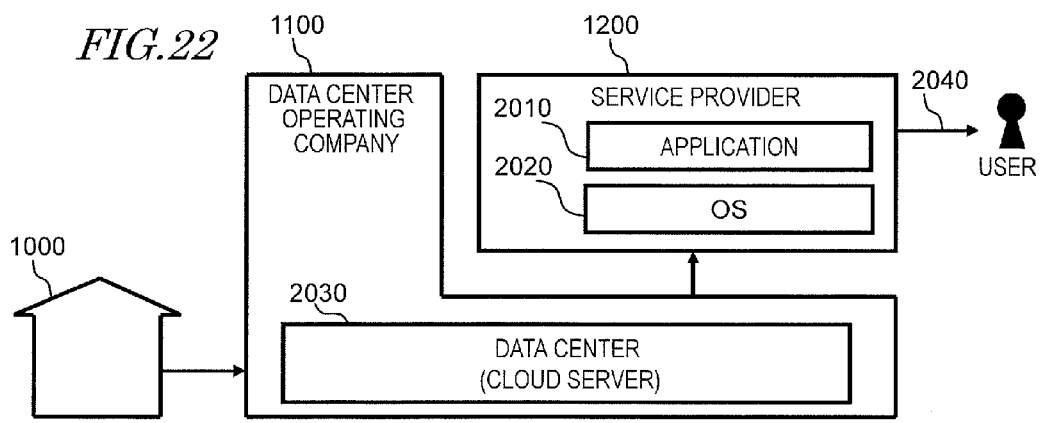
FIG. 22 Outlines the services provided by a system of Service Type 2 (cloud service using IaaS).

FIG. 22 outlines the services provided by a service providing system of Service Type 2 (cloud service using IaaS). In this description, IaaS stands for Infrastructure as a Service, and is a cloud service providing model which provides the basis of establishing and operating a computer system as an Internet-based service.

According to this type, the data center operating company 1100 operates and manages the data center (cloud server) 2030. Meanwhile, the service provider 1200 manages an OS 2020 and an application 2010. And the service provider 1200 provides services using the OS 2020 and application 2010 that are managed by the service provider 1200 by itself (as indicated by the arrow 2040).

4.3. Service Type 3: Cloud Service Using PaaS

Figure 23:
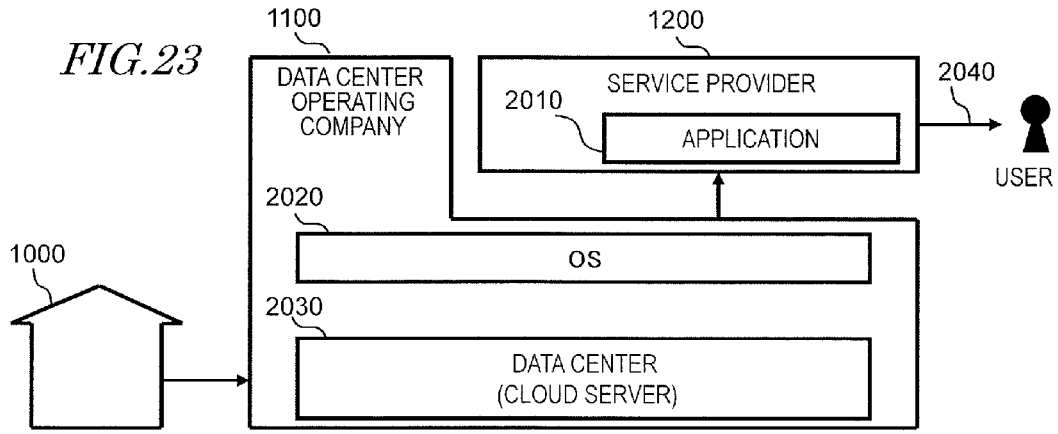
FIG. 23 Outlines the services provided by a system of Service Type 3 (cloud service using PaaS).

FIG. 23 outlines the services provided by a service providing system of Service Type 3 (cloud service using PaaS). In this description, PaaS stands for Platform as a Service, and is a cloud service providing model which provides a platform to be the basis of establishing and running software as an Internet-based service.

According to this type, the data center operating company 1100 manages the OS 2020, and operates and manages the data center (cloud server) 2030. Meanwhile, the service provider 1200 manages an application 2010. And the service provider 1200 provides services using the OS 2020 managed by the data center operating company 1100 and the application 2010 managed by the service provider 1200 itself (as indicated by the arrow 2040).

4.4. Service Type 4: Cloud Service Using SaaS

Figure 24:
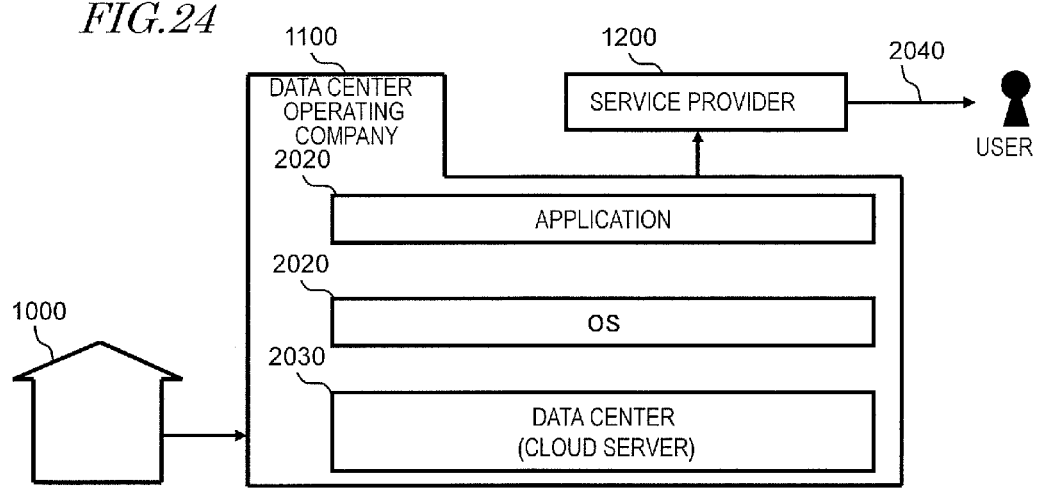
FIG. 24 Outlines the services provided by a system of Service Type 4 (cloud service using SaaS).

FIG. 24 outlines the services provided by a service providing system of Service Type 4 (cloud service using SaaS). In this description, SaaS stands for Software as a Service, and is a cloud service providing model which has the function of allowing a user such as a company or a person who owns no data center (cloud server) to use, through a network such as the Internet, an application provided by a platform provider who owns a data center (cloud server), for example.

According to this type, the data center operating company 1100 manages the application 2010 and the OS 2020, and operates and manages the data center (cloud server) 2030. Meanwhile, the service provider 1200 provides services using the OS 2020 and application 2010 managed by the data center operating company 1100 (as indicated by the arrow 2040).

According to any of these types of cloud services, the service provider 1200 provides services. Also, either the service provider or the data center operating company may either develop an OS, an application or a database of big data by themselves or have it developed by a third party.

5. Other Modified Examples

In the example illustrated in FIG. 2 of the accompanying drawings, multiple users' houses and the management server 20 are supposed to be connected together through the network 30 which is a public line. However, this configuration is only an example. For example, the users' houses shown in FIG. 2 may be respective apartments of the same condominium, and the network 30 and management server 20 may be provided within that condominium's site.

The same can be said if multiple fridges are installed within the same site and a home LAN is provided as in a two-household house. In that case, the users' houses shown in FIG. 2 correspond to the respective households of the two-generation house. Also, the network 30 and management server 20 may be provided within that two-household house's site.

Alternatively, the multiple users' houses shown in FIG. 2 may be replaced with respective guest rooms of the same hotel, because each room of a hotel is usually equipped with a fridge. In that case, the network 30 will be a LAN inside the hotel's site. The management server 20 may be provided either inside or outside of the hotel's facilities.

Still alternatively, the multiple users' houses shown in FIG. 2 may be replaced with automatic vending machines each having a fridge. In that case, the automatic vending machines are connected either with cables or wirelessly to the network 30. Yet alternatively, the multiple users' houses shown in FIG. 2 may be replaced with vehicles each having a fridge. As for the automatic vending machines and vehicles, information about the temperature of the air outside of the fridge (e.g., on the surface of the housing near the compressor), which may be the value of a temperature sensor, is obtained as log information, instead of the information about room temperature described above. It should be noted that the fridge provided for the vehicle is an electronic device to be driven with that vehicle's built-in battery.

In each of the examples of the hotel, automatic vending machines, and vehicles described above, the fridges are used for business, and therefore, a fridge that cannot operate properly due to a failure, if any, will cause a vital problem for those who run the business. That is why it is very useful if the user can see the degrees of performance deterioration of the fridges.

Also, in the foregoing description of embodiments, the trend of change is supposed to be represented using sample data that were collected at three or more points in time as shown in FIG. 13, for example. Furthermore, the foregoing description says that by representing a trend of change using such sample data that were collected under the same environmental condition, it is possible to prevent the accuracy of sensing the signs of a refrigerator's life limit from decreasing. However, according to the present disclosure, such sample data collected at three or more points in time does not always have to be used. Alternatively, the trend of change may be represented using sample data that were collected at two points in time or sample data that were collected at four or more points in time. It is not always necessary to represent the trend of change by using sample data collected under the same environmental condition, either.

Figure 25:
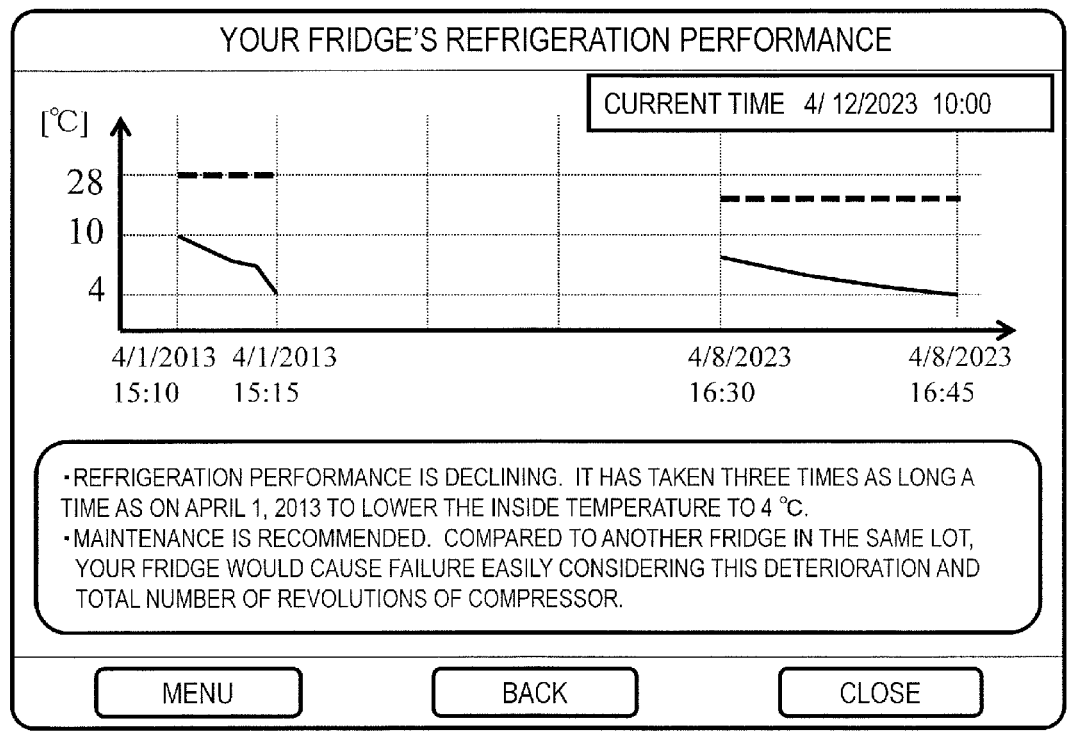
FIG. 25 Shows a trend of change represented by using two sets of sample data.

For example, FIG. 25 shows the trend of change represented by sample data that were collected in two points in time under mutually different environmental conditions. Even so, a decline in refrigeration performance can also be sensed.

For instance, if the sample data obtained on Apr. 8, 2023 is compared to the sample data obtained on Apr. 1, 2013 in the example shown in FIG. 25, it can be seen that the temperature outside the fridge has decreased. In lowering the temperature inside the fridge using the compressor 202, the lower the outside temperature, the lighter the load on the compressor 202 can be. Nevertheless, it took a lot of time for this fridge to lower the inside temperature, which should be presumably because its refrigeration performance has declined significantly.

Also, in FIG. 25, the amount of time it took to decrease the inside temperature that was lower than 10° C. to an inside temperature of 4° C. was measured. If the sample data obtained on Apr. 8, 2023 is compared to the sample data obtained on Apr. 1, 2013, it can be seen that the inside temperature should be decreased to a lesser degree on Apr. 8, 2023 than on Apr. 1, 2013, and yet it took a longer time to lower the inside temperature to that target level. Thus, this should also be presumably because its refrigeration performance has declined significantly.

For that reason, sample data collected at three points in time does not have to be used, and the trend of change does not have to be represented by using sample data that was collected under the same environmental condition.

In the foregoing description, in response to a performance indication request received from the mobile telecommunications terminal 130a, the fridge's (100a) performance information (service information) is supposed to be transmitted to the mobile telecommunications terminal 130a. However, this operation is only an example. If a predetermined condition indicating that any abnormality such as generation of leakage current, unintentional opening of the door, or a failure of the compressor 202 has occurred turns out to be satisfied, the service information generating section 430a generates notification data and transmit it to a registered display terminal, no matter whether or not a request has been received from the mobile telecommunications terminal 130a. This is so-called "push transmission".

Furthermore, in the foregoing description, display data to present maintenance information recommending that maintenance be carried out on the fridge 100a is supposed to be provided for the mobile telecommunications terminal 130a. However, display data carrying information about a proposed new type of fridge may be provided for the mobile telecommunications terminal 130a instead of the maintenance information. The maintenance information is provided on the supposition that the user will continue to use the same fridge 100a. Meanwhile, some users may want to buy a new one if his or her current fridge 100a needs maintenance. That is why the user may be allowed to decide whether he or she needs the maintenance information or information about a new type of device. Only the information chosen by the user may be presented. Or both the maintenance information and information about a new type of device may be presented to the user who wants to check out both of them.

In the foregoing description, User A is supposed to use the mobile telecommunications terminal 130a at his or her house 10a and receive the analysis results using that terminal. However, the mobile telecommunications terminal 130a is just a means for allowing User A to confirm the analysis results. For example, the telecommunications terminal does not have to be a mobile one. Also, the user may receive and confirm the analysis results using a desktop PC which is not generally used in mobile applications. Furthermore, either a display device provided for the fridge 100a or a TV monitor installed at his or her house may also be used instead of the mobile telecommunications terminal 130a to confirm the analysis results.

In the examples described above, a predetermined trend of change such as the recovery time it takes to recover the preset operating temperature or power consumption is supposed to be presented on the display screen of the mobile telecommunications terminal 130a. However, presenting such information on the display screen is just a means for presenting the information to the user. Alternatively, instead of, or in addition to, presenting the information on the display screen, an auditory presentation may be made as voice uttered through the loudspeakers (not shown) of the mobile telecommunications terminal 130a. For example, the text data shown in FIGS. 13 to 17, 19, 20 and 25 may be uttered aloud as synthetic human voice. Or the performance variation representing the trend of change may be uttered aloud by reference to the property of the graph.

Also, in the foregoing description, the group of sensors shown in FIGS. 3 to 5 are supposed to be built in the fridge. However, this is not an essential requirement. Alternatively, after a fridge with no sensors has been installed, the group of sensors and the communications circuit 207 (see FIG. 5) may be attached to the fridge to perform the processing described above. Such a group of sensors and such a communications circuit 207 (see FIG. 5) may be circulated as products on the market.

INDUSTRIAL APPLICABILITY

The present disclosure can be used effectively when implemented as a service providing system that provides cloud services by reference to the log information of electronic devices (such as fridges). In addition, the present disclosure can also be used effectively when the service providing system is providing data for the users.

REFERENCE SIGNS LIST

10a User A's house
10b User B's house
20 management server
30 network
50 service providing system (data processing system)
100a, 100b fridge
110a, 110b gateway (GW)
120a, 120b router
130a, 130b mobile telecommunications terminal
400 log storage database (DB)
410 analyze result storage database (DB)

The invention claimed is:

1. A data providing method to be carried out by a computer built in a data processing system which is designed to collect log information from electronic devices through a network and provide services based on that log information for authenticated users, the method comprising:
  receiving a fridge's log information through the network;
  generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of an ambient surrounding the fridge, (iii) a temperature inside the fridge, and (iv) opening and closing history of the fridge; and
  providing the display data for an authenticated user's display terminal, for at least one of visual representation and auditory presentation.

2. The data providing method of claim 1, wherein the display data represents the trend of change of the recovery time using at least three sets of sample data.

3. The data providing method of claim 1, wherein the display data represents the trend of change of the recovery time that indicates how long it takes for the inside temperature to recover the preset operating temperature in a situation where room temperature and the inside temperature maintain a constant relation since the fridge's door was closed.

4. The data providing method of claim 3, wherein each said set of sample data is a set of data which has been gotten at the same room temperature and at the same inside temperature and which is based on the fridge's log information.

5. The data providing method of claim 1, wherein the fridge has a filter, and
  the multiple sets of sample data include information about cleaning history of the filter.

6. The data providing method of claim 1, wherein the display data includes information about a number of revolutions of a drive system for the fridge.

7. A data providing method to be carried out by a computer built in a data processing system which is designed to collect log information from electronic devices through a network and provide services based on that log information for authenticated users, the method comprising:
  receiving a fridge's log information through the network;
  generating display data, representing a trend of change of a recovery time that indicates how long it takes for the fridge's inside temperature to recover a preset operating temperature since the fridge's door was closed, by reference to pieces of information which are included in the fridge's log information and which indicate (i) the preset operating temperature inside the fridge, (ii) the temperature of an ambient surrounding the fridge, (iii) a temperature inside the fridge, and (iv) opening and closing history of the fridge;
  providing the display data for an authenticated user's display terminal, for at least one of visual representation and auditory presentation; and
  if the recovery time has exceeded a predetermined amount of time, further providing maintenance information about the fridge's maintenance for the display terminal.

8. The data providing method of claim 7, wherein the maintenance information is included in the display data.

9. The data providing method of claim 7, wherein if the recovery time is increasing compared to past history included in the fridge's log information and if the recovery time has exceeded the predetermined amount of time, the maintenance information is further provided for the display terminal.

10. The data providing method of claim 7, comprising:
  finding at least one more fridge which has been manufactured in the same lot as the fridge by reference to a database in which information about fridges' defects is accumulated on a lot-by-lot basis;
  further spotting another fridge, in which the recovery time exceeds the predetermined amount of time, from the at least one more fridge that has been found; and
  providing maintenance information associated with information about the defect of that another fridge that has been spotted.

11. The data providing method of claim 7,
  wherein the fridge has a sensor to detect an amount of things stored in the fridge,
  if the recovery time has exceeded the predetermined amount of time and if the amount stored in the fridge that has been detected by the sensor has exceeded a certain limit, a message saying that the recovery time has exceeded the predetermined amount of time due to the fact that the amount stored in the fridge has exceeded the certain limit is sent to the display terminal, but
  if the recovery time has exceeded the predetermined amount of time and if the amount stored in the fridge that has been detected by the sensor is equal to or smaller than the certain limit, maintenance information about the fridge is provided for the display terminal.

12. A data providing method to be carried out by a computer built in a data processing system which is designed to collect log information from electronic devices through a network and provide services based on that log information for authenticated users, the method comprising:
  receiving a fridge's log information through the network;
  generating display data, representing a trend of change of a power consumption since the fridge's door was closed and until the fridge's inside temperature recovered its preset operating temperature, by reference to pieces of information which are included in the fridge's log information and which indicate (i) the preset operating temperature inside the fridge, (ii) the temperature of an ambient surrounding the fridge, (iii) a temperature inside the fridge, and (iv) opening and closing history of the fridge; and providing the display data for an authenticated user's display terminal, for at least one of visual representation and auditory presentation.

13. The data providing method of claim 12, wherein the display data represents the trend of change of the power consumption using at least three sets of sample data.

14. The data providing method of claim 12, wherein the display data represents the trend of change of a recovery time that indicates how long it takes for the inside temperature to recover the preset operating temperature in a situation where room temperature and the inside temperature maintain a constant relation since the fridge's door was closed.

15. The data providing method of claim 14, wherein each said set of sample data is a set of data which has been gotten at the same room temperature and at the same inside temperature and which is based on the fridge's log information.

16. The data providing method of claim 12, wherein the display data includes information about a number of revolutions of a drive system for the fridge.

17. The data providing method of claim 13, wherein the fridge has a filter, and the multiple sets of sample data include information about cleaning history of the filter.

18. A data providing method to be carried out by a computer built in a data processing system which is designed to collect log information from electronic devices through a network and provide services based on that log information for authenticated users, the method comprising:

receiving a fridge's log information through the network;

generating display data, representing a trend of change of a power consumption since the fridge's door was closed and until the fridge's inside temperature recovered its preset operating temperature, by reference to pieces of information which are included in the fridge's log information and which indicate (i) the preset operating temperature inside the fridge, (ii) a temperature of an ambient surrounding the fridge, (iii) a temperature inside the fridge, and (iv) opening and closing history of the fridge;

providing the display data for an authenticated user's display terminal, for at least one of visual representation and auditory presentation; and if the power consumption has exceeded a predetermined value, further providing maintenance information about the fridge's maintenance for the display terminal.

19. The data providing method of claim 18, wherein the maintenance information is included in the display data.

20. The data providing method of claim 18, wherein if the power consumption is increasing compared to past history included in the fridge's log information and if a recovery time it takes for the inside temperature to reach the preset operating temperature since the fridge's door was closed has exceeded the predetermined amount of time, the maintenance information is further provided for the display terminal.

21. The data providing method of claim 18, comprising:

finding at least one more fridge which has been manufactured in the same lot as the fridge by reference to a database in which information about fridges' defects is accumulated on a lot-by-lot basis;

further spotting another fridge, in which the power consumption exceeds the predetermined value, from the at least one more fridge that has been found; and providing maintenance information associated with information about the defect of that another fridge that has been spotted.

22. The data providing method of claim 18 wherein the fridge has a sensor to detect the amount stored in the fridge, if the power consumption has exceeded the predetermined value and if an amount of things stored in the fridge that has been detected by the sensor has exceeded a certain limit, a message saying that the power consumption has exceeded the predetermined value due to the fact that the amount stored in the fridge has exceeded the certain limit is sent to the display terminal, but if the power consumption has exceeded the predetermined value and if the amount stored in the fridge that has been detected by the sensor is equal to or smaller than the certain limit, maintenance information about the fridge is provided for the display terminal.

* * * * *